United States Patent [19]

Rutherford

[11] Patent Number: 5,048,064

[45] Date of Patent: Sep. 10, 1991

[54] VITAL RATE DECODER

[75] Inventor: David B. Rutherford, Rochester, N.Y.

[73] Assignee: General Signal Corporation, Stamford, Conn.

[21] Appl. No.: 267,214

[22] Filed: Nov. 4, 1988

[51] Int. Cl.$^5$ ...................... H03K 21/02; B61L 29/00
[52] U.S. Cl. ...................... 377/20; 307/265; 246/15; 377/55; 328/112; 328/119; 364/424.1
[58] Field of Search ...................... 328/58, 129.1, 112, 328/119; 307/265; 377/20, 55; 246/15; 364/424.1

[56] References Cited

U.S. PATENT DOCUMENTS

| | | | |
|---|---|---|---|
| 4,254,327 | 3/1981 | Beno et al. | 377/55 |
| 4,275,354 | 6/1981 | Suematsu et al. | 328/58 |
| 4,469,082 | 9/1984 | Nishitoba et al. | 307/265 |
| 4,475,086 | 10/1984 | Allen | 307/265 |
| 4,726,045 | 2/1988 | Caspell et al. | 307/265 |
| 4,805,199 | 2/1989 | Muramatsu | 377/55 |

Primary Examiner—John S. Heyman
Attorney, Agent, or Firm—John F. Ohlandt

[57] ABSTRACT

A vital microcompressor-based rate decoder for use in a vital processing system in on-board main line railroad and rapid transit automatic train protection systems; the design is such that a method is incorporated for tolerating specific kinds of signal disruption and in such a way that the probability of a wrongside failure has a calculable upper bound. A pickup coil transmits external or wayside signals to an arrangement which involves two channels and which provides period and duty cycle measurement of the pulses resulting from demodulation of the external signals. A counter is employed in each of the channels and a tolerance accumulation rate decoding device is included, the maximum amount of tolerance accumulated, and the minimum time required to accumulate it, being functions of the rate code selected.

7 Claims, 26 Drawing Sheets

FIG.6C
| | LEGEND | NOMENCLATURE EXAMPLES |
|---|---|---|
| 1. |  | GEr, GOr |
| 2. |  | SEr,s,t  SOr,s,t<br>s = $\emptyset$,1,2..,P2r-1<br>t = $\emptyset$,1,2..,P3r |
| 3. |  | XRE/Or,s,t<br>BXRE/Or,s,t<br><br>XSE/Or,s,t,$\emptyset$,t-1<br>MXRE/Or,$\emptyset$,tmx |
| 4. |  | ERr, ORr<br>REr, ROr |
| 5a. | 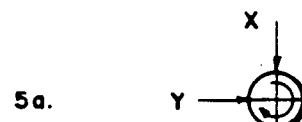 | |
| 5b. |  | |
| 5c. | | |
| 6. | 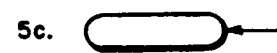 | |
| 7. |  | EREr,m   EROr,m<br>OREr,m   OROr,m<br><br>m = $\emptyset$,1,2...,TMAXr/TC |

FIG.7A

| RATE | PERIOD COUNT (TOLERANCE= +/- 5%) | | DUTY-CYCLE COUNT (TOLERANCE= 60/40) | |
|---|---|---|---|---|
| | LO | HI | LO | HI |
| 50 ppm | ----- | ----- | ----- | ----- |
| nom(@1khz) | 1140d | 1260d | 480h | 720d |
| @12.7khz | 388Eh | 3E82h | 17D0h | 23B8h |
| @37.0khz | A4C4h | B61Ch | 4560h | 6810h |
| 75 ppm | ----- | ----- | ----- | ----- |
| nom(@1khz) | 760d | 840d | 320d | 480d |
| @12.7khz | 25B4h | 29ACh | FE0h | 17D0h |
| @37.0khz | 6DD8h | 7968h | 2E40h | 4560h |
| 120 ppm | ----- | ----- | ----- | ----- |
| nom(@1khz) | 475d | 525d | 200d | 300d |
| @12.7khz | 1790h | 1A0Bh | 9ECh | EE2h |
| @37.0khz | 44A7h | 48E1h | 1CE8h | 2B5Ch |
| 180 ppm | ----- | ----- | ----- | ----- |
| nom(@1khz) | 316d | 350d | 133d | 200d |
| @12.7khz | FADh | 1150h | 699h | 9ECh |
| @37.0khz | 2DACh | 3296h | 1339h | 1CE8h |

FIG.7B

EVEN (@f1) PERIOD COUNT PARAMETER VALUES

| RATEr | PEhlr | PEllr | hl-ll | SPAN_PEr | PExr | LOLIM_PEr | PEar |
|---|---|---|---|---|---|---|---|
| 50 ppm | 3E82h | 388Eh | 5F4h | 3FFF0h | 0ACh | 2C0000h | 60098h |
| 75 ppm | 29ACh | 25B4h | 3F8h | 3FFF0h | 102h | 3C0000h | 160098h |
| 120 ppm | 1A0Bh | 1790h | 27Bh | 4006Fh | 19Dh | 2C0000h | 5FCB0h |
| 180 ppm | 115Dh | FADh | 1B0h | 40050h | 25Fh | 2C0000h | 6D4CDh |

PEmsk= 0003FFFF

FIG.7C

ODD (@f2) PERIOD COUNT PARAMETER VALUES

| RATEr | POhlr | POllr | hl-ll | SPAN_POr | POxr | LOLIM_POr | POar |
|---|---|---|---|---|---|---|---|
| 50 ppm | 861Ch | A4C4h | 1158h | 7FE90h | 076h | 480000h | -3F258h |
| 75 ppm | 7968h | 6DD8h | B90h | 7FE90h | 0B1h | 380000h | -13f258h |
| 120 ppm | 4BE1h | 44A7h | 73Ah | 7Fd1Eh | 11Bh | 480000h | -3E49Dh |
| 180 ppm | 3296h | 2DACh | 4EAh | 8012Ah | 1A1h | 480000h | -2652Ch |

POsmk= 0007FFFF

FIG.7D

EVEN (@f2) DUTY-CYCLE COUNT PARAMETER VALUES

| RATEr | DCEhlr | DCEllr | hl-ll | SPAN_DCEr | DCExr | LOLIM_DCEr | DCEar |
|---|---|---|---|---|---|---|---|
| 50 ppm | 6810h | 4560h | 22B0h | 7FE90h | 03Bh | 180000h | 802E0h |
| 75 ppm | 4560h | 2E40h | 1720h | 80A20h | 059h | 180000h | 7EBC0h |
| 120 ppm | 2B5Ch | 1CE8h | E74h | 80458h | 08Eh | 180000h | 7F750h |
| 180 ppm | 1CE8h | 1339h | 9AFh | 7FB3Dh | 0D3h | 180000h | 82805h |

DCEmsk = 0007FFFF

FIG.7E

ODD (@f1) DUTY-CYCLE COUNT PARAMETER VALUES

| RATEr | DCOhlr | DCOllr | hl-ll | SPAN_DCOr | DCOxr | LOLIM_DCOr | DCOar |
|---|---|---|---|---|---|---|---|
| 50 ppm | 23B8h | 17D0h | 0BE8h | 3FFF0h | 056h | C0000h | 40020h |
| 75 ppm | 17D0h | 0FE0h | 07F0h | 3FFF0h | 081h | 1C0000h | 140020h |
| 120 ppm | 0EE2h | 09ECh | 04F6h | 402EAh | 0CFh | C0000h | 3FA2Ch |
| 180 ppm | 09ECh | 0699h | 0353h | 3ffDCh | 134h | C0000h | 40FECh |

DCOmsk = 0003FFFF

VITAL RATE DECODER

BACKGROUND AND SUMMARY OF THE INVENTION

The present invention relates to a vital microprocessor-based rate decoder for use in onboard mainline railroad and rapid transit ATP (Automatic Train Protection) systems.

An appreciation of the larger system can be gained by reference to co-pending applications Ser. No. 267,070 and 267,218, assigned to the assignee of the present invention, the details of the disclosures of which are incorporated herein by reference. In particular, FIG. 10 of this application depicts the larger system in block form.

The unique rate decoder of the invention incorporates a method for tolerating specific kinds of signal disruption; it further allows the signal disruption to be tolerated to be specified per application.

A fundamental object of the present invention is to design the entire system in such a way that the probability of wrongside failure has a calculable upper bound.

The present invention applies, first of all, the concept of "Tolerance Accumulation", allowing specific types of signal disruption to be tolerated. It further applies the concept of Numerically Integrated Safety Assurance Logic (NISAL) to the design of each of the functions required in the vital rate decoder to allow the calculation of an upper bound to the probability of a wrongside failure.

A vital rate decoder comprises several functions. Each must be designed such that the integrity of the information created or operated on by the function cannot be compromised. This requirement is imposed on the system because of the vital nature of the device.

The functions to be performed are:

a. Interpret the demodulated output of a rate code pick-up coil as a pulse of a particular "rate".

b. Determine a pulse to be valid only if its characteristics, pulse width and duty cycle meet established criteria.

c. Establish a rate as valid only if the immediate history of the received pulses are valid pulses related to that rate and meet established criteria.

d. Output vital data values once each system cycle (Tcyc) which uniquely specify the current established rate.

e. Insure that an established rate remains so only while specified criteria are continually met.

DEFINITION OF TERMS

The following terms are defined within the context of this disclosure.

Wrongside Failure

The failure of any hardware component leading to a situation which is actually or potentially unsafe. "Potentially" is used here to account for those situations in which a particular set of external circumstances may be required to produce an unsafe result. In this context, an unsafe situation is one in which a more permissive output is produced than would have been produced in the absence of the failure.

Vital

A characteristic of a function or an operation which requires it to operate safely, i.e., with an acceptably low probability of wrongside failure in the event of a hardware failure.

Also, a characteristic of a system or device which enables it to operate with an acceptably low probability of a wrongside failure in the event of a hardware failure.

Nisal (Numerically Integrated Safety Assurance Logic)

A design concept applied to microprocessor-based systems which endows the system with certain characteristics:

1. The performance of a logical or numerical operation and its outcome are vitally represented by a unique N-bit numerical value. The value is constructed by the operation and only exists if the operation is successfully completed.

2. Application of NISAL to a microprocessor-based function requires that each and every operation necessary to be vital is accomplished in such a way that the operation is verified by the generation of the unique numerical value selected to represent the successful completion of the operation.

3. The probability of the correct N-bit numerical value being generated without the operation it represents being successfully completed can be shown to be less than or equal to some fixed value. This fixed value is called the "probability of a wrongside failure" (PWF).

Polynomial Division

Polynomial division as used here is defined as the division of an N-but binary number by a primitive polynomial (P) of degree N. This operation produces two results, a quotient Q and a remainder R.

Values A, B, and C can be combined together using polynomial division as follows:

A is divided by P, resulting in R(A). R(A) is x'ORed with B and the result is divided by P, giving R(AB). R(AB) is x'ORed with C and divided by P giving R(ABC) and Q(ABC), either of which may be used as the final result.

A property of polynomial division as described above is that if any or all of the three values A, B, or C are in error, the probability that the result R(ABC) (or Q(ABC)) would be correct is essentially $\frac{1}{2}**N$ (1 in 2 to the Nth power). This is due to pseudo-random properties of division by a primitive polynomial.

Preconditioning

In the example above, parameter values A, B, and C were combined via polynomial division to form results R(ABC) and Q(ABC). The numerical values of R and Q would thus be determined solely by the numerical values of A, B, and C. If it is required that either R(ABC) or Q(ABC) be a predetermined value, then the polynomial division process could be "preconditioned" by first x'ORing the A parameter with a "preconditioning constant", whose value is such that the result (R(ABC) or Q9ABC)) would be the predetermined value only if A, B, and C were correct.

Note that the use of preconditioning does not affect the integrity of combining values via polynomial division.

Even/Odd System Cycles

The "system cycle time" is denoted Tc and is nominally 100 msec. All of the functions are performed each system cycle. In order to be able to vitally distinguish data results between adjacent cycles, the cycles are denoted EVEN and ODD and results of each of the operations produce different numerical values on EVEN and ODD cycles. Variables and result values associated with EVEN cycles are denoted with subscript "E", while those associated with ODD values are denoted with subscript "0".

Other and further objects, advantages and features of the present invention will be understood by reference to the following specification in conjunction with the annexed drawing, wherein like parts have been given like numbers.

BRIEF DESCRIPTION OF THE DRAWINGS

FIG. 4A is a functional block diagram, along with a coordinated pulse diagram FIG. 4B, which illustrates the scheme for extracting duty cycle information as well as period length; only one channel is shown, the other channel being similar.

FIG. 6C provides the legends used, that is, definitions of the symbols used in describing the state diagram of the tolerance accumulation rate decoding algorithm.

FIGS. 7A-7E are tables which provide a variety of even and odd period count parameter values.

FIGS. 8A-8K illustrate the state diagrams involved in the valid rate generator operation.

DESCRIPTION OF PREFERRED EMBODIMENT

A. Tolerance Accumulation Rate Decoding

Figure 2:
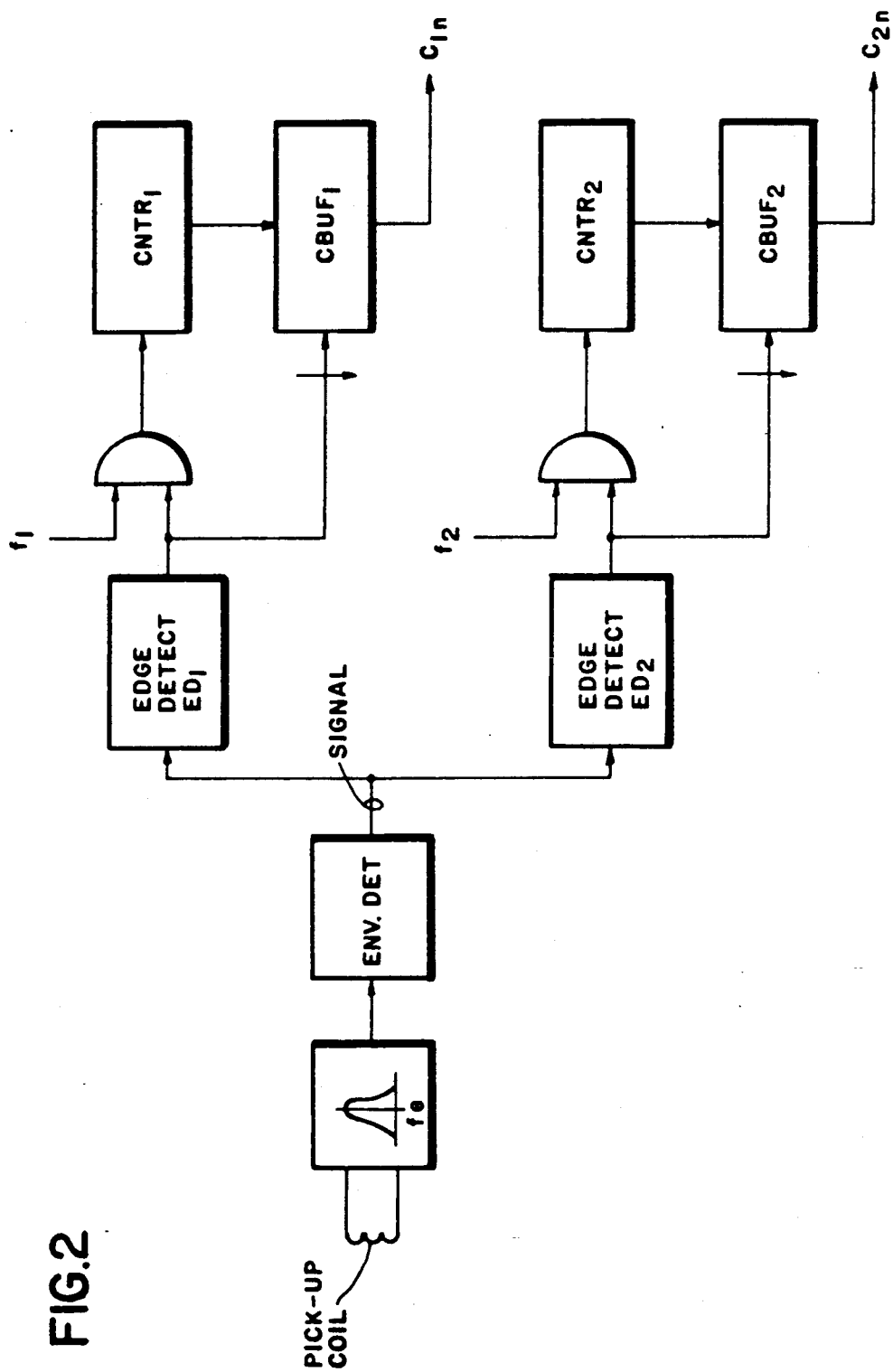
FIG. 2 is a two-channel period/duty cycle measurement scheme in accordance with the present invention.

The method or technique of rate decoding in association with the present invention is one which "accumlates" tolerance when the incoming pulses are valid (for the currently selected rate) and "consumes" the accumulated tolerance when incoming pulses are invalid. The maximum amount of tolerance accumulated and the minimum time required to accumulate it may be functions of the rate code selected, i.e., different rate codes may accumulate tolerance at different rates to different maximums.

Before describing the algorithm that underlies the concept of the present invention, a short example is given below:

1. The period of the pulses is measured by counting the cycles of a high speed clock occurring between successive positive-going edges. A "valid" pulse is one whose period count falls within the range defined as valid for each rate code.

2. Let 4 equal the number of consecutive valid pulses required to select rate "r".

3. Let 4 equal the number of consecutive valid pulses required after rate "r" has been selected to increase the "tolerance" by 1.

4. Let 4 equal the maximum value of "tolerance". Note that the tolerance value is the number of invalid pulses which will be forgiven. Each time one is used, i.e., each time an invalid pulse is forgiven, the value of the tolerance is decreased.

5. The following sequence of pulses is decoded as below: ("*" is an invalid 75-rate pulse).

| # | Pulse Width | Selected Code Rate | Accumulated Tolerance |
|---|---|---|---|
| 1 | 75 | — | 0 |
| 2 | 75 | — | 0 |
| 3 | 75 | — | 0 |
| 4 | 75 | 75 | 1 |
| 5 | * | 75 | 0 |
| 6 | 75 | 75 | 0 |
| 7 | 75 | 75 | 0 |
| 8 | 75 | 75 | 0 |
| 9 | 75 | 75 | 1 |
| 10 | 75 | 75 | 1 |
| 11 | 75 | 75 | 1 |
| 12 | 75 | 75 | 1 |
| 13 | 75 | 75 | 2 |
| 14 | * | 75 | 1 |
| 15 | 75 | 75 | 1 |
| 16 | * | 75 | 0 |
| 17 | 75 | 75 | 0 |
| 18 | 75 | 75 | 0 |
| 19 | * | — | 0 |
| 20 | 75 | — | 0 |
| 21 | 75 | — | 0 |
| 22 | 75 | — | 0 |
| 23 | 75 | 75 | 1 |
| 24 | 75 | 75 | 1 |
| 25 | 75 | 75 | 1 |
| 26 | 75 | 75 | 1 |
| 27 | 75 | 75 | 2 |
| 28 | 75 | 75 | 2 |
| 29 | 75 | 75 | 2 |
| 30 | 75 | 75 | 2 |
| 31 | 75 | 75 | 3 |
| 32 | 75 | 75 | 3 |
| 33 | 75 | 75 | 3 |
| 34 | 75 | 75 | 3 |
| 35 | 75 | 75 | 4 |
| 36 | 75 | 75 | 4 |
| 37 | 75 | 75 | 4 |
| 38 | 75 | 75 | 4 |
| 39 | 75 | 75 | 4 |
| 40 | 75 | 75 | 4 |
| 41 | * | 75 | 3 |
| 42 | * | 75 | 2 |
| 43 | * | 75 | 1 |
| 44 | 75 | 75 | 1 |
| 45 | 75 | 75 | 1 |
| 46 | 75 | 75 | 1 |
| 47 | 75 | 75 | 2 |
| 48 | * | 75 | 1 |
| 49 | * | 75 | 0 |
| 50 | 75 | 75 | 0 |
| 51 | 75 | 75 | 0 |
| 52 | 75 | 75 | 0 |
| 53 | 75 | 75 | 1 |
| 54 | * | 75 | 0 |

B. Description of "Tolerance Accumulation" Algorithm

1. Let TMAXr be the maximum amount of time allowed to elapse before the current rate code is reaffirmed. In the case of the 75 rate code, let TMAX(75)=1.2 sec. (The nominal pulse width of the 75 rate is 800 ms.)

If there is no reaffirmation of the 75 rate within 1.2 sec., then the rate is automatically de-selected. In its place the "no code" rate is selected or, if another code has become valid in a parallel channel, then it will be selected.

If there is no positive edge 1.2 sec after the previous positive edge and 75 rate is selected, then the 75 rate must be artifically "reaffirmed".

This is done by decrementing the tolerance value (if the tolerance value is non-zero) just prior to the 1.2 sec limit and substituting an acceptable value. (NOTE: In this example, if 75 rate is currently selected and the new rate is "no code", the 75 rate will remain valid for up to 3.6 sec after the beginning of "no code". The tolerance parameters for the 75 rate code may be changed to vary the amount of time the rate will remain valid.)

2. Let TMINr be the minimum period of time to be considered as a possible valid pulse for rate "r". Those pulses whose periods are less than TMINr will be ignored. By ignoring high frequency pulses, the accumulated tolerance values will not be used up by bursts of high frequency noise.

Note that TMINr should be less than the TNOM of the highest frequency valid rate code.

3. Let TNOMr be the nominal period for rate "r" and let TDELr be the period tolerance for rate "r" such that if the period is measured to be within (TNOMr±TDELr), then the period is acceptable for rate "r".

Let CNOMr=the nominal "count" value equivalent to TNOMr.

let CDELr=the count value equivalent to TDELr,
let CMINR=the count value equivalent to TMINr, and
let CMAXr=the count value equivalent to TMAXr.
let Cn=the period count during period number "n".

Figure 1:
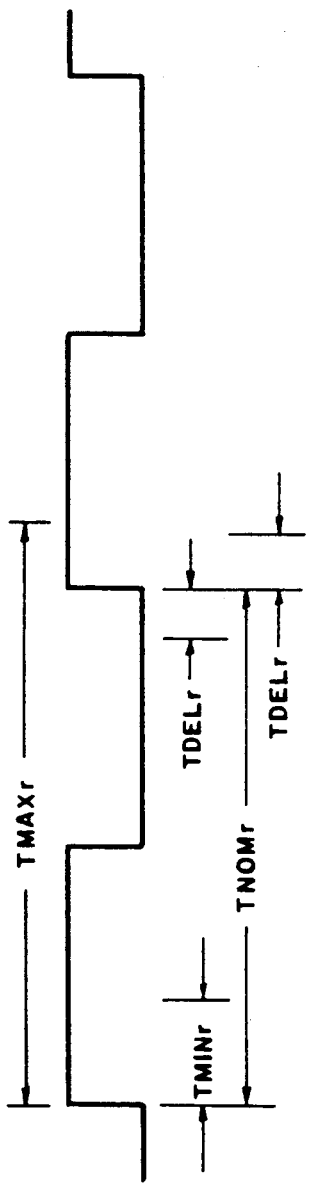
FIG. 1 is a pulse diagram which illustrates the parameters involved such as $TMAX_r$ involved with the selected code rating.

FIG. 1 shows the relationship between TMAXr, TMINr, TNOMr and TDELr.

4. The main system elements of a two-channel system are defined as:

a. Pick-up coil, carrier filter (a filter at carrier frequency Fc with bandwidth 2*Fw), and an envelope detector, where the output of the envelope detector is a digital waveform.

b. Edge detectors (ED1/ED2) which detect positive edges in the digital waveform, one independent detector for each channel.

c. High-frequency clocks f1 and f2.

d. A digital counter CNTR1 with a temporary storage output buffer CBUF1 for channel 1 and likewise CNTR2 and CBUF2 for channel 2.

e. A processor with two external interrupt inputs, one from each edge detector.

FIG. 2 shows a simple diagram of a two-channel system.

Implementation

The following description is that of the implementation of tolerance accumulation rate decoding using NISAL (Numerically Integrated Safety Assurance Logic).

Figure 3:
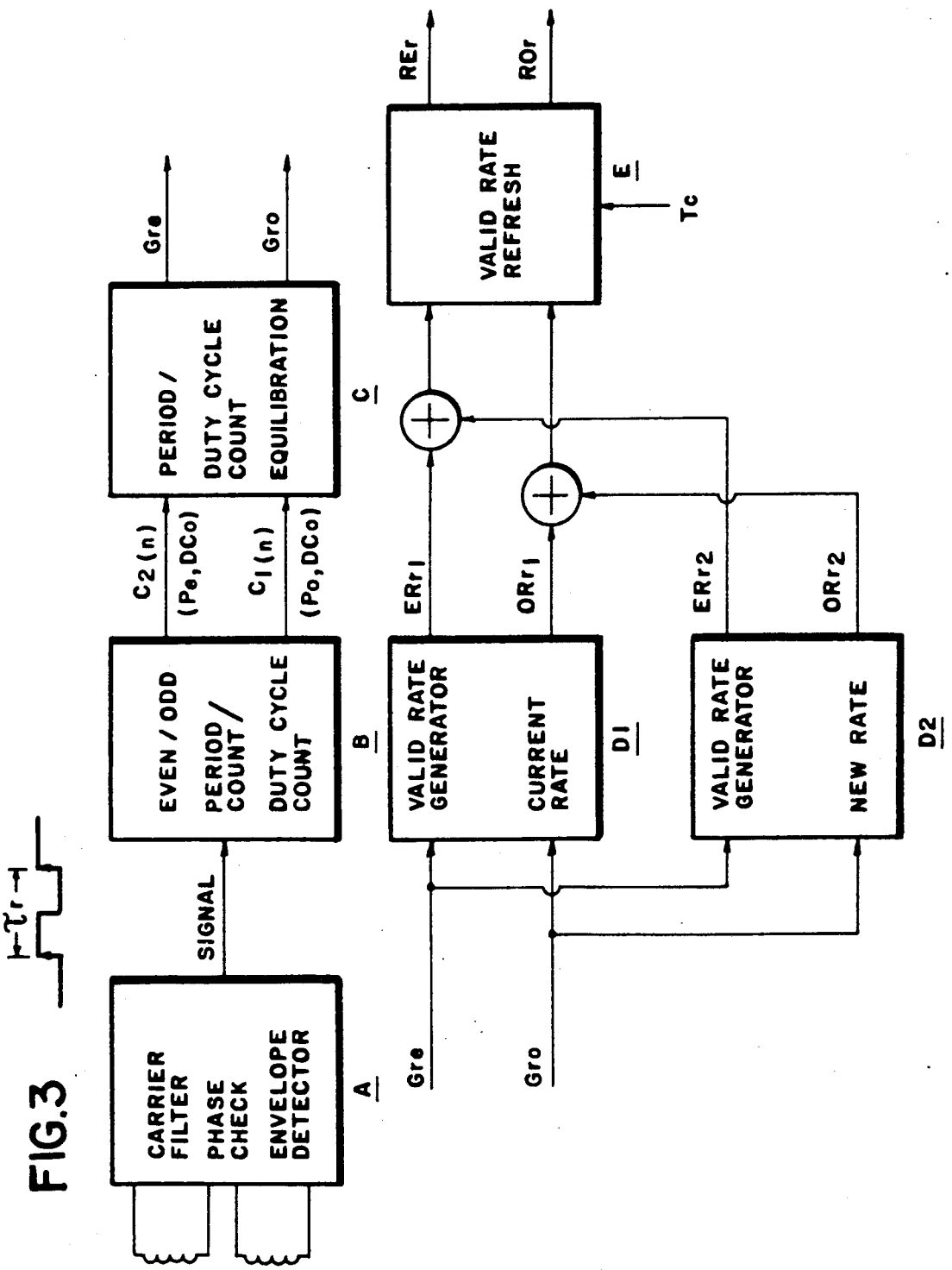
FIG. 3 is a functional block diagram illustrating the tolerance accumulation rate decoding scheme of the present invention.

FIG. 3 shows a functional block diagram of the tolerance accumulation rate decoding scheme. The block labelled A represents all of the functions required to create a digital signal at the code rate. It involves filtering the incoming signals with a bandpass filter centered at the carrier frequency (with a bandwidth small enough to exclude noise pulses of frequencies substantially higher than that of the highest rate code), checking the phase relationship between signals received by each of two pick-up coils at the carrier frequency fc (they should be 180 degrees out of phase), and envelope detection. The output of block A is a digital signal with period "Tr".

Block B includes the functions of measuring the period and duty cycle of the digital signal in two channels. The outputs of the two channels are C1(n) and C2(n) each Tr seconds. The interpretation of C1(n) and C2(n) depends on whether "n" is an "even" or "odd" period of the incoming signal, as explained below.

If "n" is EVEN, then:

$Pen = C2(n) - C2(n-1) =$ EVEN cycle period measurement measured in # counts @ freq. $f1$.

$DCen = C1(n) - C1(n-1) =$ EVEN cycle duty-cycle measurement measured in # counts @ freq. $f2$.

If "n" is ODD, then:

$Pon = C1(n) - C1(n-1) =$ Odd cycle period measurement measured in # counts @ freq. $f2$.

$DCon = C2(n) - C2(n-1) =$ ODD cycle period measurement measured in # counts @ freq. $f1$.

Block C performs the function of doing the calculation of Pen/DC and Pon/Dcon as described above, and then performs an "equilibration" operation on the sets of values Pen/DCen or Pon/DCon, depending on whether Tr represents an ODD or EVEN rate code cycle.

"Equilibration" is an operation which produces a single value (Gre on EVEN cycles, Gro on ODD cycles) which represents the fact that the period value and duty-cycle value just measured are within the allowed bounds of the period and duty-cycle of rate "r". A further explanation of "equilibration" is found below in Section C2.

Blocks D1 and D2 of FIG. 3 verify that a rate "r" has met the conditions described in the "tolerance accumulation" algorithm described in Sections A and B. Blocks D1 and D2 represent duplicate concurrent functions. While the current rate "r" is being "maintained" by one function (D1 in the figure), the second function is available to establish a new rate.

The output of block D1 is a pair of digital values unique to the establishment of rate "r" and alternating with every ODD or EVEN cycle. The names of the alternating values output by the block which has established the current rate are ERr and ORr. These values must be unique for each rate code "r", and there is only one valid set of values for each rate code "r". In the event that a new rate becomes established by block D2, its output takes precedence. The figure shows the outputs of blocks D1 and D2 ORed (not exclusive-ORed), indicating that the outputs of one block OR the other is used.

The time between alternating values ERr and ORr is Tr seconds. Note that Tr varies as the current rate code signal.

The valid rate code signals ERr and ORr are sent to block E of the figure every Tr seconds. Block E represents the "Valid Rate Refresh" function (VRR). Its purpose is to supply the system (beyond the rate-decoder function) with a unique pair of digital values representing a valid rate code every "Tc" seconds, where Tc is the "cycle time" of the entire system. The names of these output signals are REr and ROr.

It is part of the vital requirements of the rate-decoder function that REr and ROr exist only if valid ERr/ORr data are received within some designated margin of Tr seconds.

The sections below describe the functions of FIG. 3 individually and in more detail.

C1. Two-Channel Period Measurement with Duty Cycle

Figures 4A, 4B:
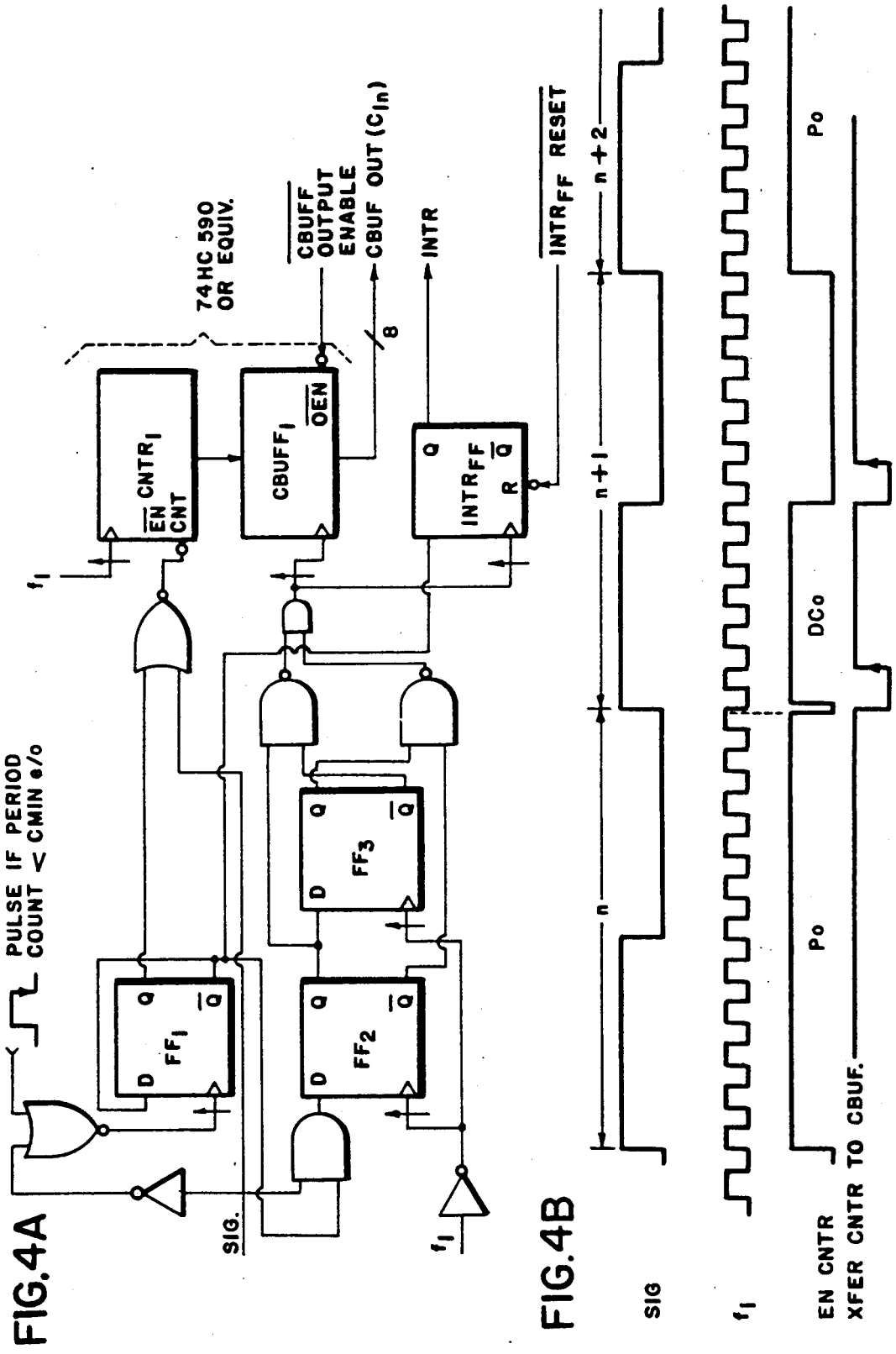

FIG. 4A shows the functional diagram of a scheme to extract duty cycle information as well as period length. Only one channel is shown; the second channel is similar.

Duty cycle information is accumulated by allowing the counter of one channel to count during the positive portion of the incoming signal, while the other channel is incrementing the counter during the entire period of the incoming signal (i.e., between positive-going edges). Thus, at the end of each "even" period (as defined above), the channel 2 buffer (CBUF2) will contain information concerning the length of the previous period (Pe, as measured by the number of counts at f2 between positive-going edges), and the channel 1 buffer (CBUF1) will contain information concerning the length of the positive portion of the incoming signal (DCe, as measured by the number of counts accumulated at F1).

Note that the counts in CBUF1 and CBUF2 will be relative to their counts from the previous cycle. If the current cycle ("n") is even, then $Pen = C2n = C2(n) - C2(n-1)$, and $DCen = C1n = C1(n) - C1(n-1)$.

At the end of the next cycle of the incoming signal, CBUF1 will contain the period measurement for the "odd" cycle (Po), while CBUF2 will contain the "odd" duty cycle measurement DCo.

FIG. 4B shows cycle "n" as an odd cycle. CNTR1 accumulates counts via F1 during the entire period "n". At the positive-going edge at the end of period "n", the contents of CNTR1 are transferred to CBUF1 via FF2 and FF3. Note that while CNTR1 is incremented on the positive edge of f1, data is latched into CBUF1 on the negative edge of f1, avoiding transfer errors.

During the positive half of the next cycle (n+1), CNTR1 again accumulates counts. At the end of the positive portion of the cycle, CNTR1 data is again transferred to CBUF1 via FF2 and FF3.

The interrupt FF (INTRFF) is set each time data is transferred to CBUF1. This is a signal to the CPU to recover the CBUF1 data before it is lost during the next transfer. The minimum time allotted the CPU to recover the CBUF data is ½ the period of the highest frequency pulse admitted through the carrier filter. If the bandwidth of the carrier filter is on the order of 20 Hz, this minimum time would be on the order of 50 ms.

Figure 5:
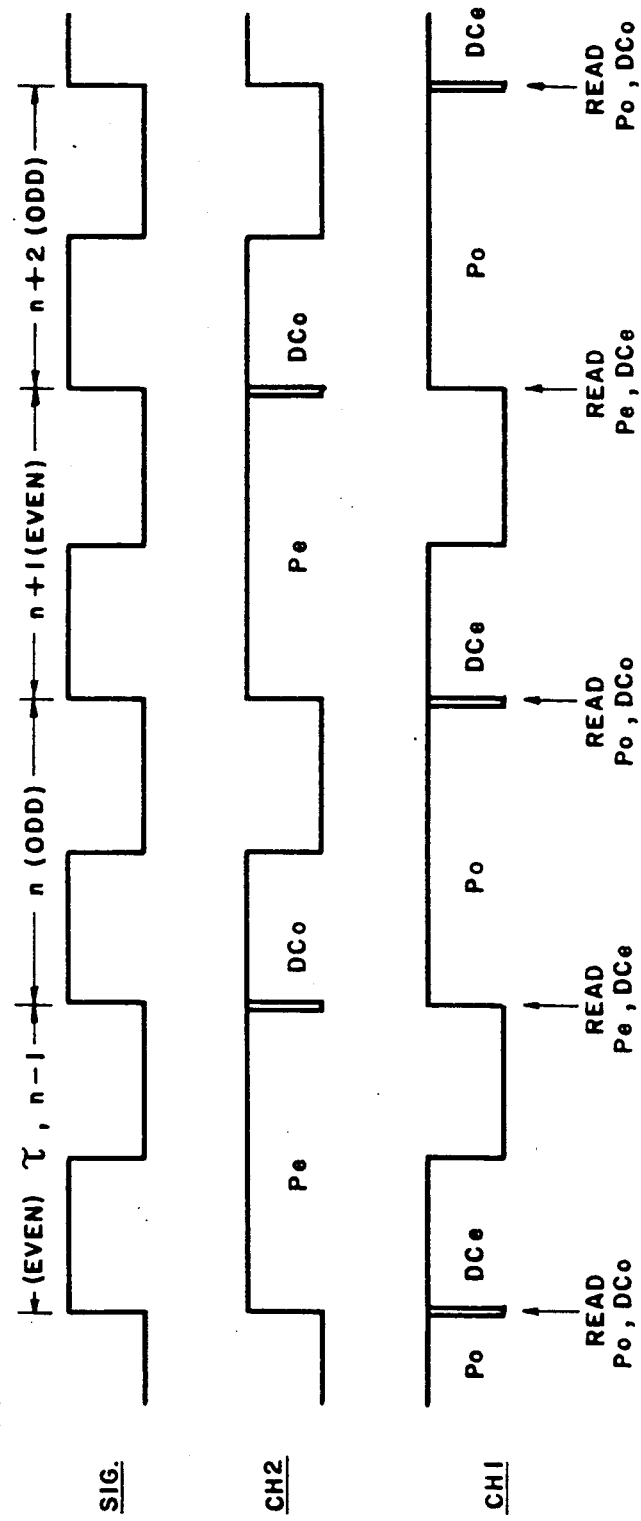
FIG. 5 illustrates the relationship between data available to the CPU from CBUFF1 and CBUFF2 and the even/odd cycles of the rate-coded signal.

FIG. 5 shows the relationship between data available to the CPU from CBUF1 and CBUF2 and the even-/odd cycles of the rate-coded signal. At the end of each "odd" period, $C1(n) - C1(n-1) = C1n = Pon$ and $C2(n) - C2(n-1) = C2n = DCon$.

If the next cycle is n+1 and is "even", then at the end of the "n+1" period, $C1(n+1) - C1(n) = C1n = DCen$ and $C2(n+1) - C2(n) = C2n = Pen$.

C2. Period and Duty Cycle Measurement Equilibration

Equilibration is the process used to determine the validity of the period and duty-cycle counts received on even and odd cycles with respect to the allowed ranges of values specified for each rate code.

Acceptable ranges for period and duty-cycle counts (even and odd cycles) must be specified for each rate code. These parameters are CMINr(e/o), CNOMr(e/o) and CMAXr(e/o).

The object of determining whether a count value (period count for instance) is within the allowed range is complicated by the fact that the range values are not allowed to be "known" by the processor. Thus, a process must be constructed which will ultimately result in a "good" rate value (GEr/GOr) if and only if the period and duty-cycle counts lie within the acceptable range of count values for rate "r".

Thus, for rate 50, the nominal period count is 1200±60. The range of counts accumulated at frequency f1 would be 388E to 3E82 (hex), while the range at frequency f2 would be A4C4 to B61C (hex). The corresponding ranges for the duty-cycle counts would be 17D0 to 23B8 (f1) and 4560 to 6810 (f2). For each of these ranges, a multiplication factor is calculated such that the range of allowed values after multiplication would span an arbitrary HEX value. The target value for the span will be denoted SPAN_PER (for EVEN cycle period count) and the multiplication factor is denoted PExr. FIG. 7B shows SPAN_PEr approximately equal to 40000 h for "r"=50. For each rate then, the multiplication factor is chosen so that the span of the range extremes for each rate will be the same value. In the example shown in FIG. 7B, the multiplication factor for rate 50 is 0ACh (i.e., PExr=0ACh for r=50).

Once the multiplication factor has been chosen and the multiplication performed, an "additive" constant is selected and added to the result. The purpose of the additive constant is to make the extreme values of the range coincide with two values, the lower of which is arbitrarily selected so that its HEX representation will have some number of trailing zero bits. For rate 50, the target value for the lower range extreme is 2C0000h. Let LOLIM_PEr denote the value of the EVEN cycle lower range extreme of the final target period value for rate "r". The value 60098 h is the additive constant for rate 50 and is denoted PEar.

FIGS. 7D and 7E show the equivalent parameter values for the duty-cycle associated with each rate. For the example of the 50 PPM rate, the EVEN cycle multiplication factor is 3 Bh, the target range difference is 80000 h, and the additive factor is 802E0h, with an ultimate target value of 180000 h for the extreme low end of the range.

The calculation of the "even good rate pulse value" (GEr) then proceeds as follows:

First the following terms are defined:
PEin = input period count, EVEN cycle (using f1).
PExr = multiplicitive constant for EVEN period count, rate "r".
PEar = additive constant for EVEN period count, rate "r".

PEmsk = mask of the form 0003FFFF or 0007FFFF.
PRpcr = EVEN period preconditioning constant.
DCEin = input duty-cycle count, EVEN cycle (using f2).
DCExr = multiplicitive constant for EVEN duty-cycle count, rate "r".
DCEar = additive constant for EVEN duty-cycle count, rate "r".
DCEmsk = mask of the form 0003FFFF or 0007FFFF.
DCRpcr = EVEN duty-cycle preconditioning constant.

First the intermediate value PEA is formed as a remainder as follows: (note: $<R>$ denotes "remainder" and "@" denotes "32-bit PD shift").

$$PEAr = <R> PEpcr .XOR. PExr @ .XOR. PEar @$$
$$.XOR. ((PEin * PExr) + PEar) @$$

Then the intermediate value PEB is formed as a remainder as follows:

$$PEBr = <R>(PEin * PExr + PEar) .AND. PEmsk @$$

A final "period" value PEr is formed as a simple ex-OR of PEAr and PEBr as below:

$$PEr = PEAr .XOR. PEBr.$$

The above computation results in the pre-selected value PEr only if:

$$LOLIM\_PEr < = ((PEin * PExr) + PEar) < = LOLIM\_PEr + SPAN\_PEr.$$

Note that the preconditioning constant PEpcr may be calculated such that the computation will result in a pre-selected value for PEr (assuming PEin is within the correct range).

Next the intermediate value DCEA is formed as a remainder as follows: (note: $<R>$ denotes "remainder" and "@" denotes "32-bit PD shift").

$$DCEAr = <R> DCDpcr .XOR. DCExr @ .XOR.$$
$$DCEar @ .XOR. ((DCEin * DCExr) + DCEar) @$$

Then the intermediate value DCEB is formed as a remainder as follows:

$$DCEBr = <R>(DCEin * DCExr + DCEar) .AND. DCEmsk @$$

A final "period" value DCEr is formed as a simple ex-OR of DCEAr and DCEBr as below:

$$DCEr = DCEAr .XOR. DCEBr.$$

The above computation results in the pre-selected value DCEr only if:

$$LOLIM\_DCEr < = ((DCEin * DCExr) + DCEar) < = LOLIM\_DCEr + SPAN\_DCEr.$$

Note that the preconditioning constant DCEpcr may be calculated such that the computation will result in a pre-selected value for DCEr (assuming DCEin is within the correct range).

Finally, the EVEN cycle "good pulse at rate 'r'" parameter value GEr is formed by:

$$GEr = <Q> DCEr @ .xor. PEr @.$$

Note that the ODD cycle parameters, resulting in GOr, are calculated in an identical manner, however the numerical values of the individual parameters will be different.

Valid Rate Generation

Implementation of the tolerance accumulation rate decoding algorithm involves defining four parameters for each rate code "r" and one system parameter (CMIN) which specifies the minimum period count which is to be recognized.

a. P1r = number of consecutive "good" pulses of rate code r required to initially establish the rate.
b. P2r = number of consecutive "good" pulses of rate code r required to increment the "tolerance" by 1 after rate r has been established.
c. P3r = the maximum value the "tolerance" parameter is allowed to achieve for rate code r.
d. TMAXr = the maximum amount of time allowed to elapse with no pulse information output from the equilibration block for the currently established rate code r.
e. CMIN = the minimum period count which will be accepted by the valid rate generator as a rate code pulse. If the period count is less than CMIN, the pulse is ignored.

Flow charts 1a and 1b describe the logical operations which take place in the Valid Rate Generator.

Figure 6A:
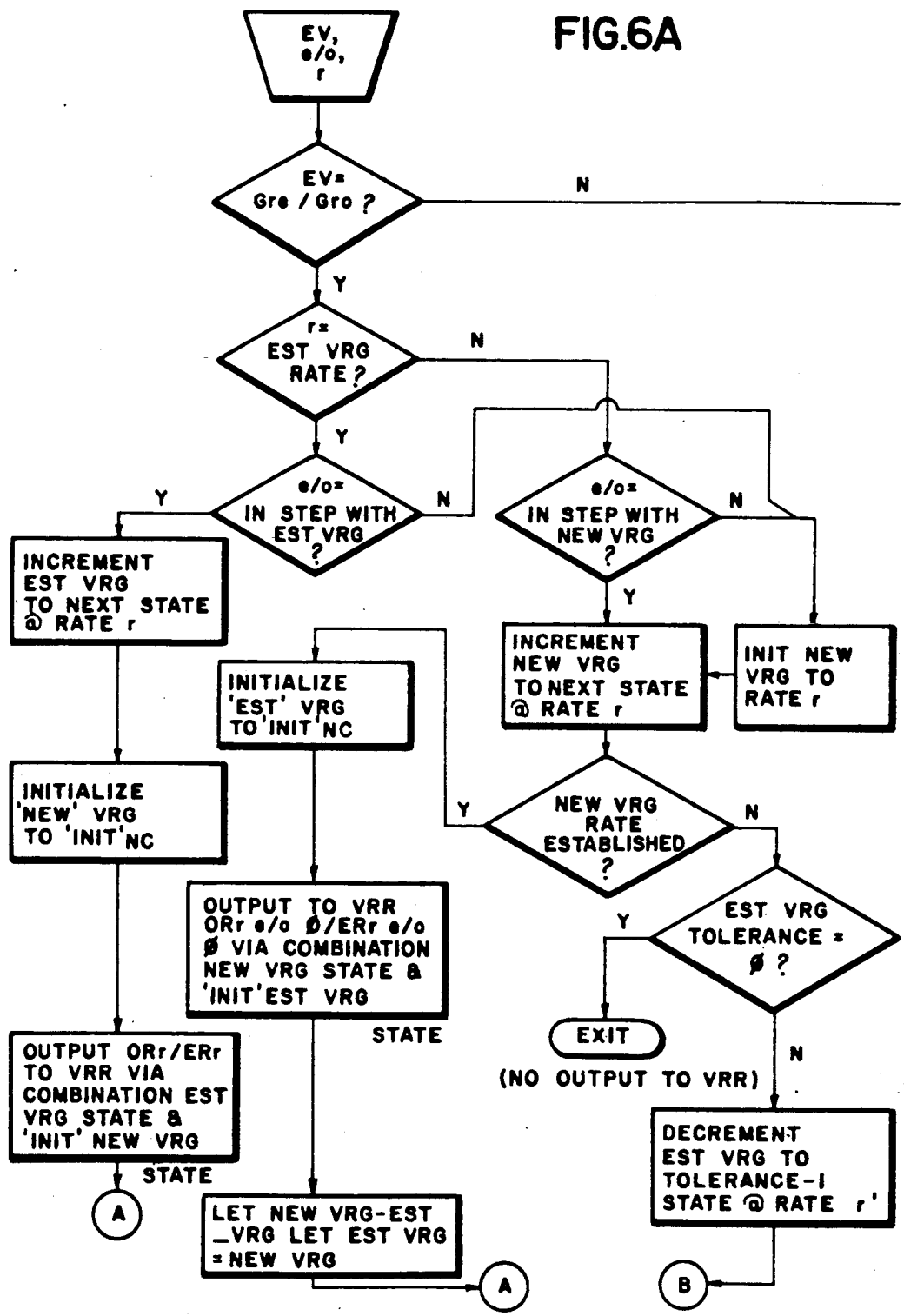
FIGS. 6A and 6B are flowcharts or diagrams describing the logical operations which take place in the valid rate generator (seen in FIG. 3) described in section D of this specification.
Figure 6B:
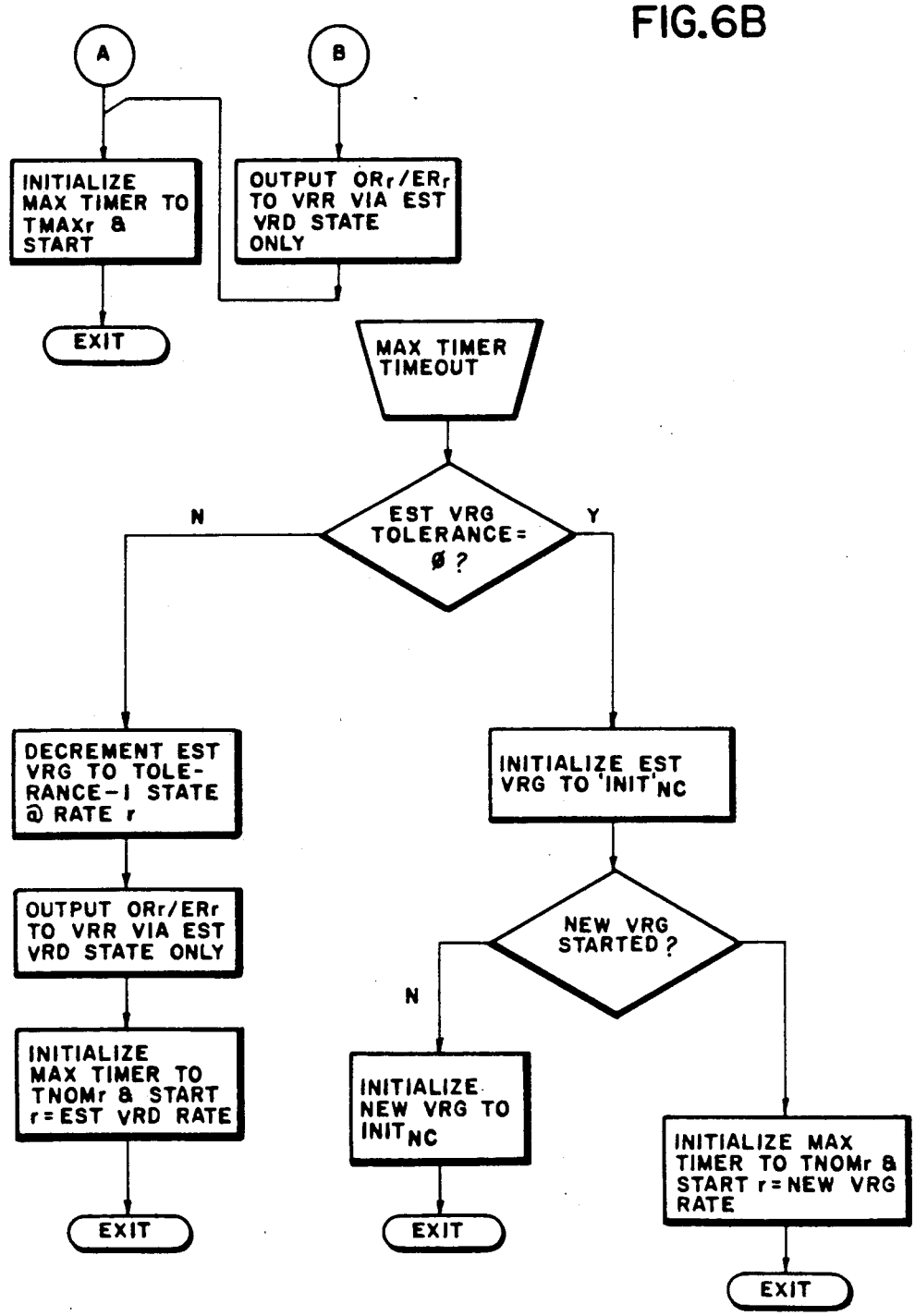

The LEGEND for section D (FIG. 6) is a definition of the symbols used in describing the state diagram of the Tolerance Accumulation Rate Decoding algorithm. The numbered symbols in the LEGEND correspond to the definitions below.

1. Symbol for 32-bit equilibrated data from the data equilibration function (block C of FIG. 3). "GEr" denotes a non-vitally checked Good period/duty-cycle parameter for code rate "r", 2. Symbol for the current state of the Valid Rate Generator polynominal divider (PDg). The nomenclature "SOr,s,t" describes the current state of PDg. "r" designates rate code r, "t" is the current tolerance value, and "s" is the "step" value, or number of consecutive good pulses received since the tolerance value "t" was last incremented. "SO" means that the last pulse received was during an ODD cycle. Likewise, "SE" indicates that the last pulse received was during an EVEN cycle.

3. This symbol is that of a PROM entry used to create another parameter value or PDg state by combining it with the current state of PDg.

There are a number of different types of PROM values with nomenclatures to match, each type being used for a different purpose. These types will be described later.

4. This symbol is used to depict the VALID RATE PARAMETER generated by the Valid Rate Generator (VRG) and sent to the Valid Rate Refresh (VRR) function. The black arrow head in the figure shows that the parameter (ERr or ORr) is generated as the "quotient" of the polynomial division of the current state of PDg XORed with some PROM parameter. "Quotient" generation is described in 5 below.

5a. This symbol represents the exclusive-ORing of two parameters and the subsequent division by a polynominal of the same degree as the number of bits in each parameter.

This operation will be called XOR/PD. In the case of the Valid Rate Generator, one of the parameters is always the current state of the polynomial divider PDg. It is assumed to be 32 bits in length. The symbol 5a shows two 32-bit parameters x and y being combined. Assuming x is the current state of PDg, the parameter y (either a value stored in PROM or a RAM variable, also of 32 bits) is xORed with the current state x of PDg and the result exists as a new state in PDg. PDg is then shifted 32 times through its feedback taps which represent the polynomial of degree 32. Note that the polynomial is primitive.

Two results may be produced from this operation. They are the "quotient" and the "remainder". The remainder is the state of PDg after the xORing and the 32-bit shift are complete. The quotient is produced (serially in effect) by the state of the msb of PDg after each shift. That is, the state of bit 31 of PDg is the state of bit 31 of the quotient. The state of bit 31 of PDg after the first shift is the state of bit 30 of the quotient, and so on. The way in which the quotient is actually realized depends on the algorithm used to perform the polynomial division in software. It must be equivalent, however, to the process just described.

The advantage of using the quotient of this operation is that the PD state which enabled the quotient value to be produced no longer exists after the operation is complete.

5b. Symbol 5b was described in 4 above. It is the "quotient" result of the combination of two parameters (the state of PDg with a PROM parameter). The fact that it is a "quotient" result is indicated by the black arrow.

5c. Symbol 5c is the current state of PDg, as described in 2 above. It is included here to show that when it is the result of a XOR/PD operation, it is the "remainder" term.

6. The symbol shown in 6 is just the "OR" operation. In the state diagram, it represents that either "a" OR "b" will be chosen as parameter "c".

7. This symbol is defined as the state of the polynomial divider in the Valid Rate Refresh function. It is called PDf. The nomenclature is that of one of the initial states of PDf, and it will be described below.

Description of Valid Rate Generator Nomenclature a. $S(E/O)r,s,t$

The nomenclature SEr,s,t describes the current state of PDg. "r" and "t" mean that for rate code r, the tolerance value currently equals "t" (implying that the current PDg state is the equivalent of having received $t \times P2$ consecutive good pulses).

"s" means that there have been s additional consecutive good pulses at rate r. SE means that the last pulse received was during an EVEN cycle.

The general form of the nomenclature is $S(E/O)r,s,t$ - where $t=0,1,2,\ldots P3r$ and $s=0,1,2,\ldots P2r-1$.

b. $XR(E/O)r,s,t$

PROM parameter "XREr,s,t" is used to produce the Valid Rate Parameter (ORr in this case) from the combination of a valid PDg state and a "good" period/duty-cycle pulse of rate r (GOr in this case).

Figure 8A:
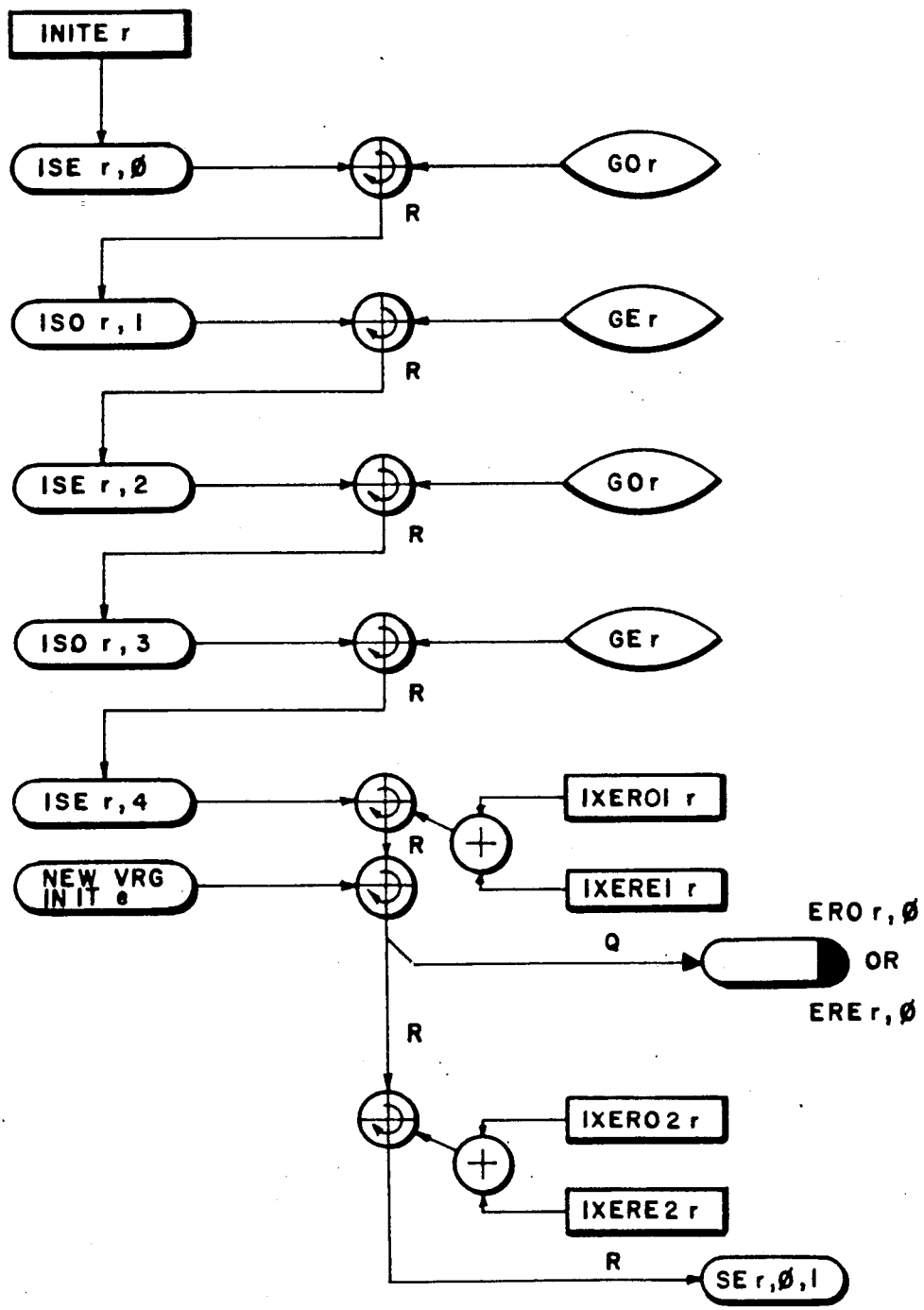
Figure 8B:
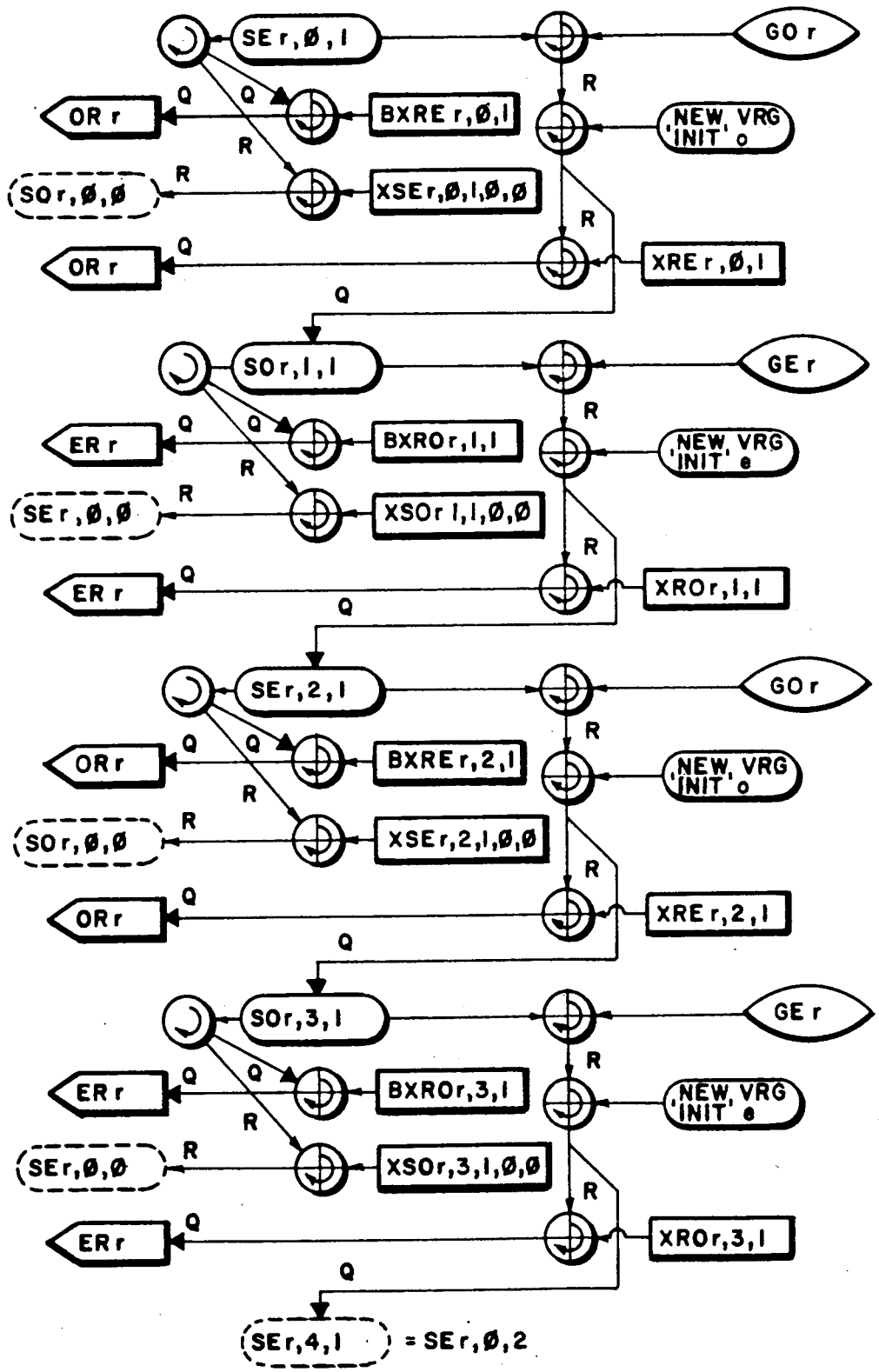

An example is found in the Valid Rate Generator state diagram FIG. 8B. Here the current PDg state is SEr, 0,1 and the next good rate pulse is GOr. These two values are combined and their remainder is combined with the state of the background VRG (which should be the INITIAL ODD state). The result of this operation is a quotient (the next foreground VRG state, SOR, 1,1) and a remainder. It is this remainder which is combined with the PROM value XREr, 0,1 to produce the Valid Rate Output ORr as a quotient. Thus XR(E/O)r,s,t is a PROM value which normalizes the current VRG state into a valid output if and only if a good pulse of the same rate and appropriate cycle is received and the background VRG is in its INITIAL state.

The generalized form of the XR PROM parameter is $XR(E/O)r,s,t$, where s,t, and E/O correspond to the PDDDg state $S(E/O)r,s,t$.

c. $BXR(E/O)r,s,t$

PROM parameter "BXR(E/O)r,s,t is used to produce the Valid Rate Parameter from a valid PDDDg state in the absence of a "good" period/duty-cycle pulse of rate r, thus using up one of the tolerance values.

Using FIG. 8B as an example, PDg state SEr, 0,1 is first shifted 32 times through the PD to form a remainder and a quotient. The quotient is then combined with BXREr, 0,1 so that the resultant quotient is the Valid Rate Parameter ORr.

The remainder of the shifted SEr, 0,1 value mentioned above is now transformed into a valid state value, but a state value with a tolerance parameter value less by one (see d below).

d. $XS(E/Or,s,t,O,t-1$

PROM parameter $XS(E/O)r,s,t,O,t-1$ is used to produce the valid PDg state $S(O/E)s,O,t-1$ in the absence of a "good" period/duty-cycle pulse of rate "r".

Using FIG. 8B as an example, PDg is in state SEr, 0,1 and is waiting for a "good" rate r pulse GOr. In the absence of G"Or, the PDg state SEr, 0,1 is shifted 32 times, producing a remainder and a quotient. A new PDg state is created and a tolerance value is effectively consumed by combining the PROM parameter XSEar, 0,1,0,0 with the remainder to get SOr, 0,0. In this particular case, once the tolerance value is consumed the state of PDg will not support any more such operations in the absence of a good pulse of rate r.

Note that regardless of the value of "s" in the current PDg state, the value of "s" in the next (tolerance reduced) state is arbitrarily changed to zero.

The generalized form of the XS PROM parameter is $XS(E/O)r,s,t,O,t-1$; where s, t, and E/O correspond to the PDg state $S(E/O)r,s,t$ which was the state of PDg when the expected good pulse was missed, and O, t−1, and O/E correspond to the PDg state $(S(O/E)r,O,t-1$ after the tolerance value has been consumed.

e. $IS(E/O)r,s$

The nomenclature IS(E/O)r,s describes a state of PDg during the "initialization" of rate code r. Using FIG. 8A as an example, "ISEEEr, 0" means that rate code r has not yet been established but a good pulse of rate "r" has been received on an ODD cycle. ISEr, 0 is stored in PROM and used in just this case. This initial PDg state is then combined with GOr and the operation's remainder is the new initial state ISOr, 1.

The general form of the nomenclature is $IS(E/O)r,s$, where $s=0,1,2,\ldots P1r$.

f. $ER(E/O)r,m$ and $OR(E/O)r,m$

The symbol ER(E/O)r,0 indicates an initial (zero) state of the Valid Rate Refresh function polynomial divider, Pdf. EREr, 0 indicates that PDf was set to its initial state due to the reception of a good "ODD" pulse of code rate r (ORr). EREr, 0 also indicates that the next state output from the Valid Rate Refresh function (output every Tc seconds) is to be the "ODD" state ROr.

Thus, there are four different initial states of PDf: ERER, 0, EROr, 0, ORER, 0 and OROr, 0. Note that "m" equals 0,1,2,3, ..., TMAXr/Tc, where TMAXr is the maximum time rate code r can remain established without either receiving a good pulse of rate code r or using up one of the tolerance values.

g. R(E/O)r

R(E/O)r is the Vital Rate Refresh output parameter value. R(E/O)r is the value which is output from the VRG to the rest of the system every Tc seconds, where Tc is the system cycle. Tc is nominally 100 ms. Each period of Tc seconds is designated at EVEN or ODD, just as the cycles of incoming rate code pulses are designated EVEN or ODD. Thus REr is output as a vital indication that rate "r" is the current rate every EVEN Tc cycle, while ROr is output on ODD cycles.

h. XER(E/O)r,m and XOR(E/O)r,m

X(E/O)R(E/O)r,m are PROM constants used in the Vital Rate Refresh (VRR) portion of the rate decoder. Using FIG. 9A as an example, XERER,m is combined with the current state PDf of VRR to produce alternating values of REr and ROr every Tc seconds.

If TMAXr="M" Tc cycles, then the max value of m="M". This means that XERER,m will be able to generate REr and ROr values from the current states of VRR (ERER,m) for "M" Tc cycles only.

The generalized nomenclature is X(E/O)R(E/O)r,m, where m=0,1,2,3,4, . . . , M−1, where M=TMAXr/Tc, and the current value of "m" corresponds to (E/O)R(E/O)r,m, which is the current state (PDf) of the VRR section.

i. XEOR(E/O)r,m and XEOR(E/O)r,m

XEOR(E,O)r,m and XOER(E/O)r,m are PROM constants used in the Vital Rate Refresh (VRR) portion of the rate decoder. Using FIG. 9A as an example, XEORER,m is combined with the current state PDf of VRR to produce the next INITIAL value of PDf at the time the next valid ORr or ERr parameter is received from the VRG section. The result of the combination of PDf with XEORER,m, for instance, is either ORER,0 or OROr,0, depending on which Tc cycle the VRG output was received on.

The generalized nomenclature is XEOR(E/O)r,m, or XOER(E/O)r,m where m=0,1,2,3,4, . . . , M−1, where M=TMAXr/Tc, and the current value of "m" corresponds to (E/O)R(E/O)r,m, which is the current state (PDf) of the VRR section.

j. INIT(E/O)r, IXER(E/O)(½)r, IXOR(E/O)(½)r, MXT(E/O)r,s,tmx

These are additional PROM parameters, the functions of which will become evident in the course of the explanation of the Valid Rate Generator operation below.

Valid Rate Generator Operation

Preliminary

There are two Valid Rate Generators operating concurrently (see blocks D1 and D2 of FIG. 3). They may be denoted VRG1 and VRG2, or "current" VRG and "new" VRG, depending on the context in which they are being discussed. If VRG1 has an established rate "r", then VRG2 must be in its INITIAL state as long as "good" or valid pulses are received at rate "r". If a pulse is received at rate "k", then VRG2 will attempt to establish rate "k", while VRG1 keeps rate "r" established as long as possible by consuming tolerance values. Only one of the Vrg's may have an established rate at any given time, and it can be either VRG1 or VRG2.

The VRG which has a rate established is called the "current" VRG, while the VRG attempting to establish a new rate is called the "new" VRG.

If VRGn is trying to establish rate "r" but it is not yet established, the receipt of an invalid pulse will return VRGn to its INITIAL state.

A. The first operation in Valid Rate Generation is initialization, or the establishment of a valid rate code. FIG. 8A shows the initialization of rate "r" where Pr1=4. This means that four consecutive good pulses are required to establish rate r.

FIG. 8A is the state diagram for initializing rate r when the first good pulse is received on an ODD cycle. The polynomial divider PDg is initialized to state ISER,0 via PROM parameter INITEOr (note: INITEOr=ISER,0). The initial good pulse value GOr is combined with the PDg value using the XOR/PD operation and the new state (the remainder of the operation) is ISOr,1.

If the next pulse is also a good pulse for rate r, its value, GEr, is combined with the current value of PDg to form ISER,2. The operation continues as shown until PDg=ISER,4 (since Pr1=4).

At this point, an initial value for the VRR is formed. If the cycle of VRR is EVEN, then ERER,00 is formed; otherwise EROr,0. The appropriate value is formed by combining IXERE1r or IXERO1r with ISER,4 and combining the remainder of this intermediate state with the INITIAL value (EVEN cycle) of the other ("new") VRG to prove that it does not harbor an established rate. The quotient of this operation is either ERER,0 or EROr,0.

To repeat, the "quotient" value "ERER,0" is formed and sent to the Valid Rate Refresh function (to become the next state of PDDf) if the value transmitted by PDf on the last Tc cycle was ODD (ROr). Likewise "EROr,0" is formed if the value transmitted by PDf on the last Tc cycle was EVEN (REER).

The remainder of the operation which formed ER(E/o)r,0 is used to form, the first valid established VRG state, SEr,0,1. The selection of the PROM value "IXERE2r" or "IXERO2r" is made depending on the circumstances above.

The remainder of the above operationis then the first established state for rate "r". Note that the tolerance parameter value t=1.

Figure 8C:
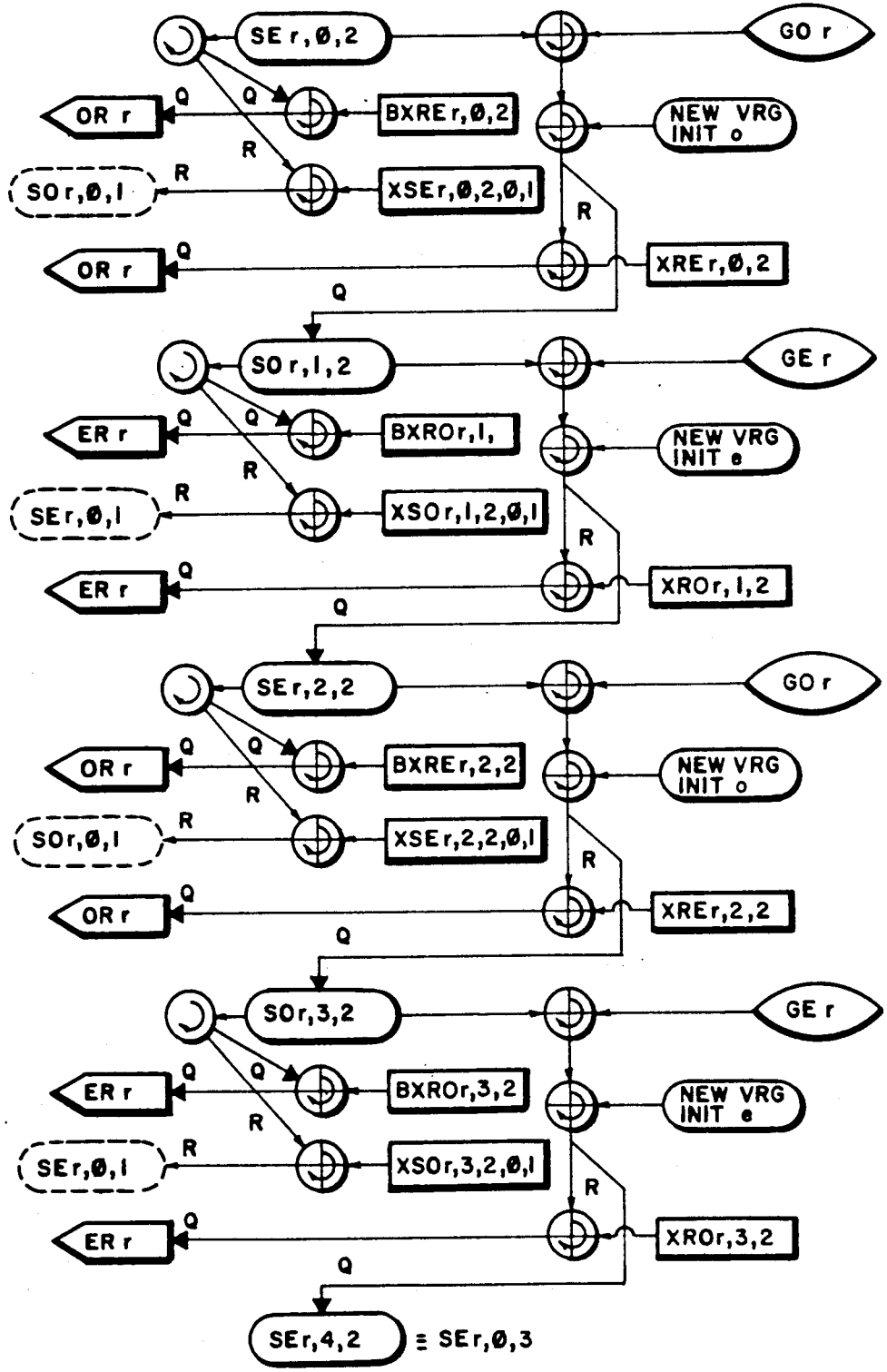
Figure 8D:
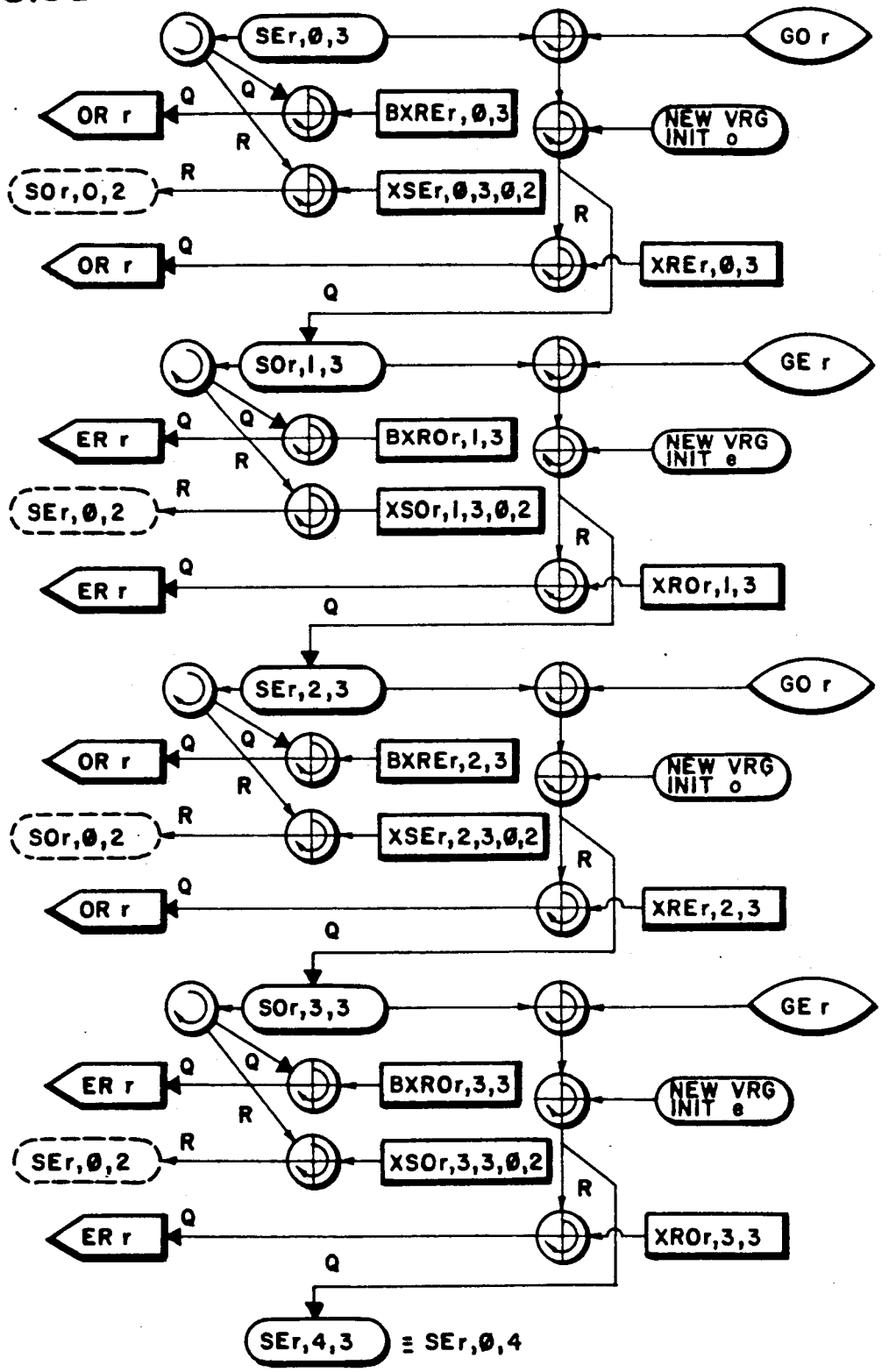
Figure 8E:
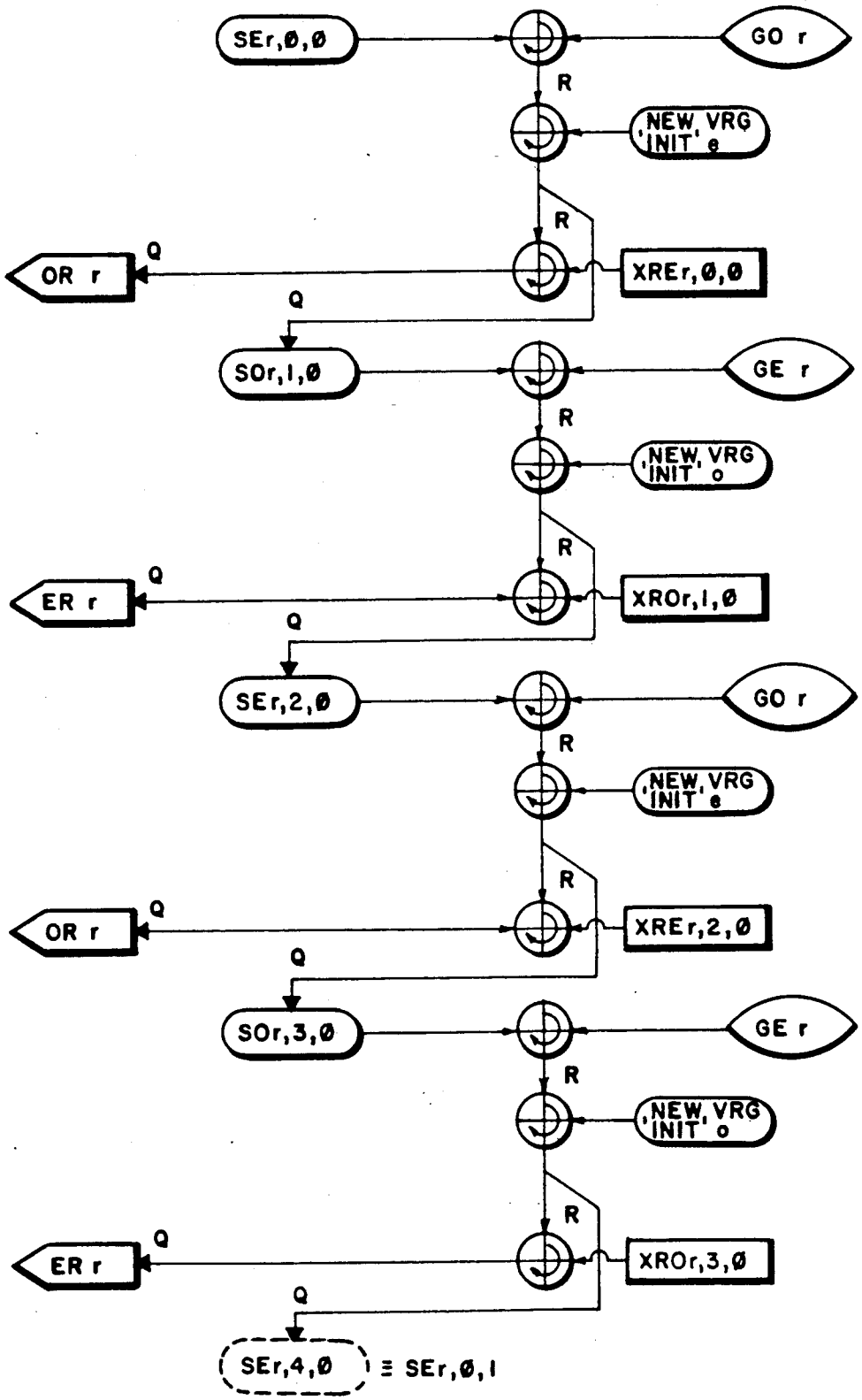
Figure 8F:
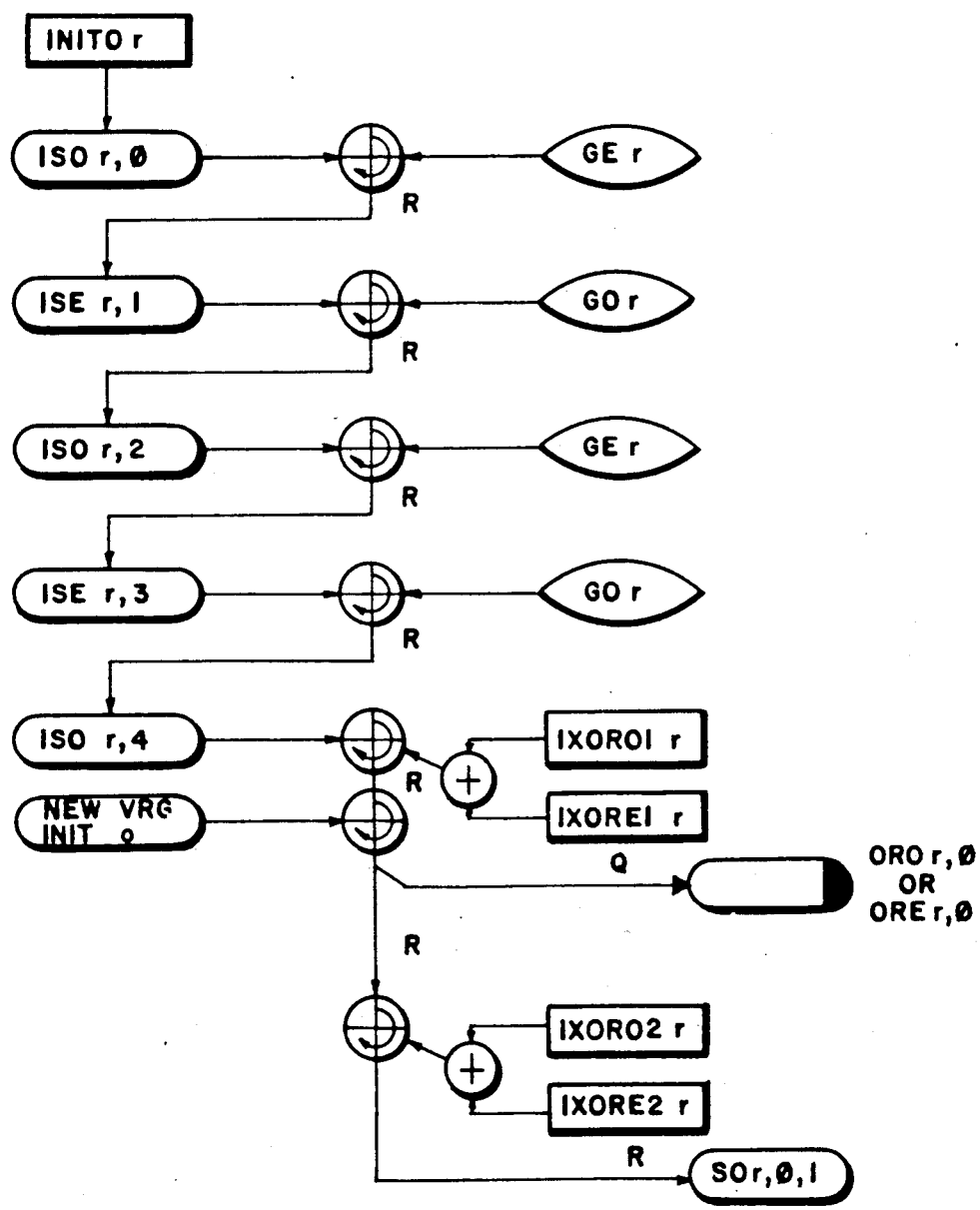
Figure 8G:
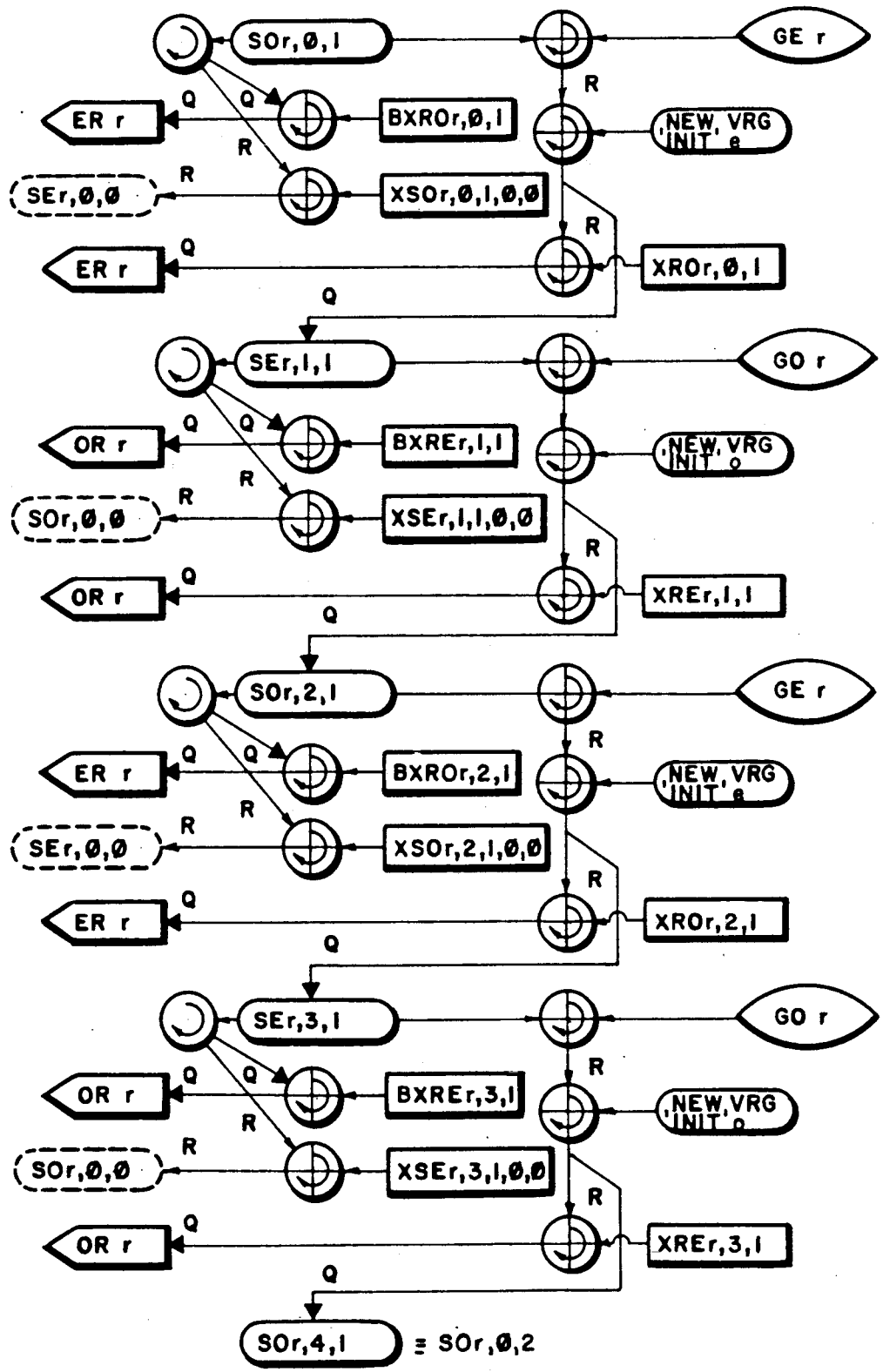
Figure 8H:
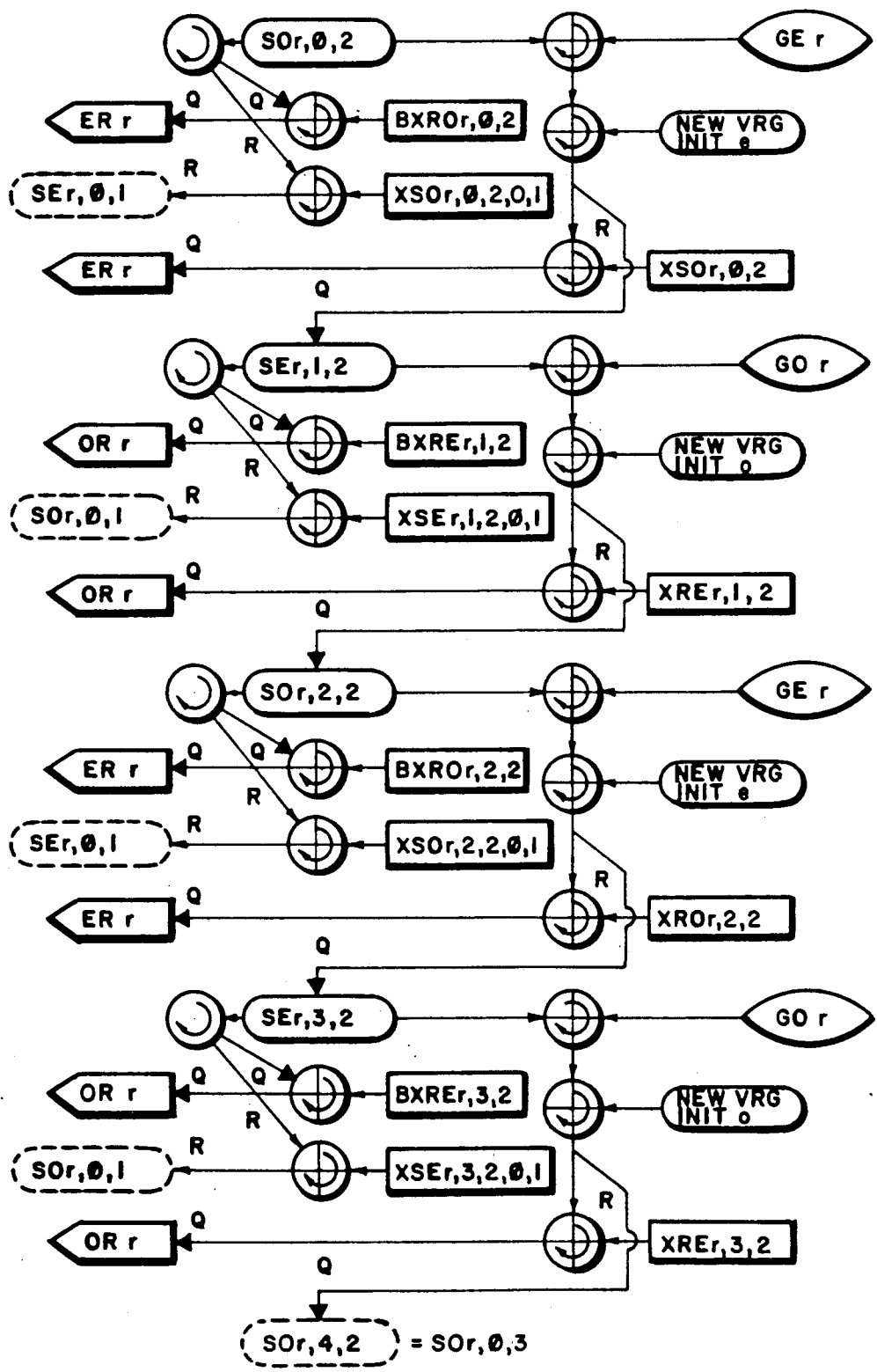
Figure 81:
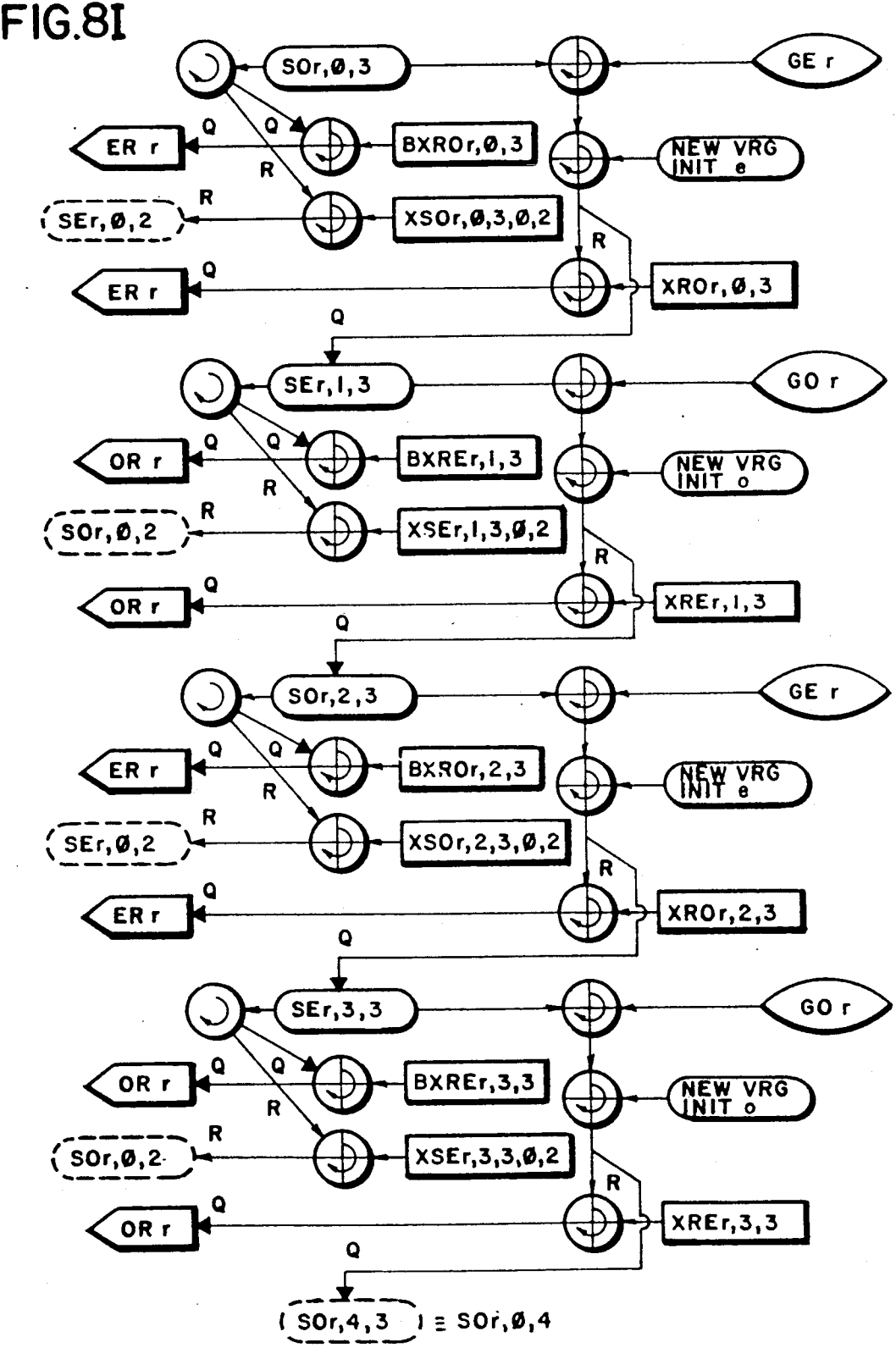
Figure 8J:
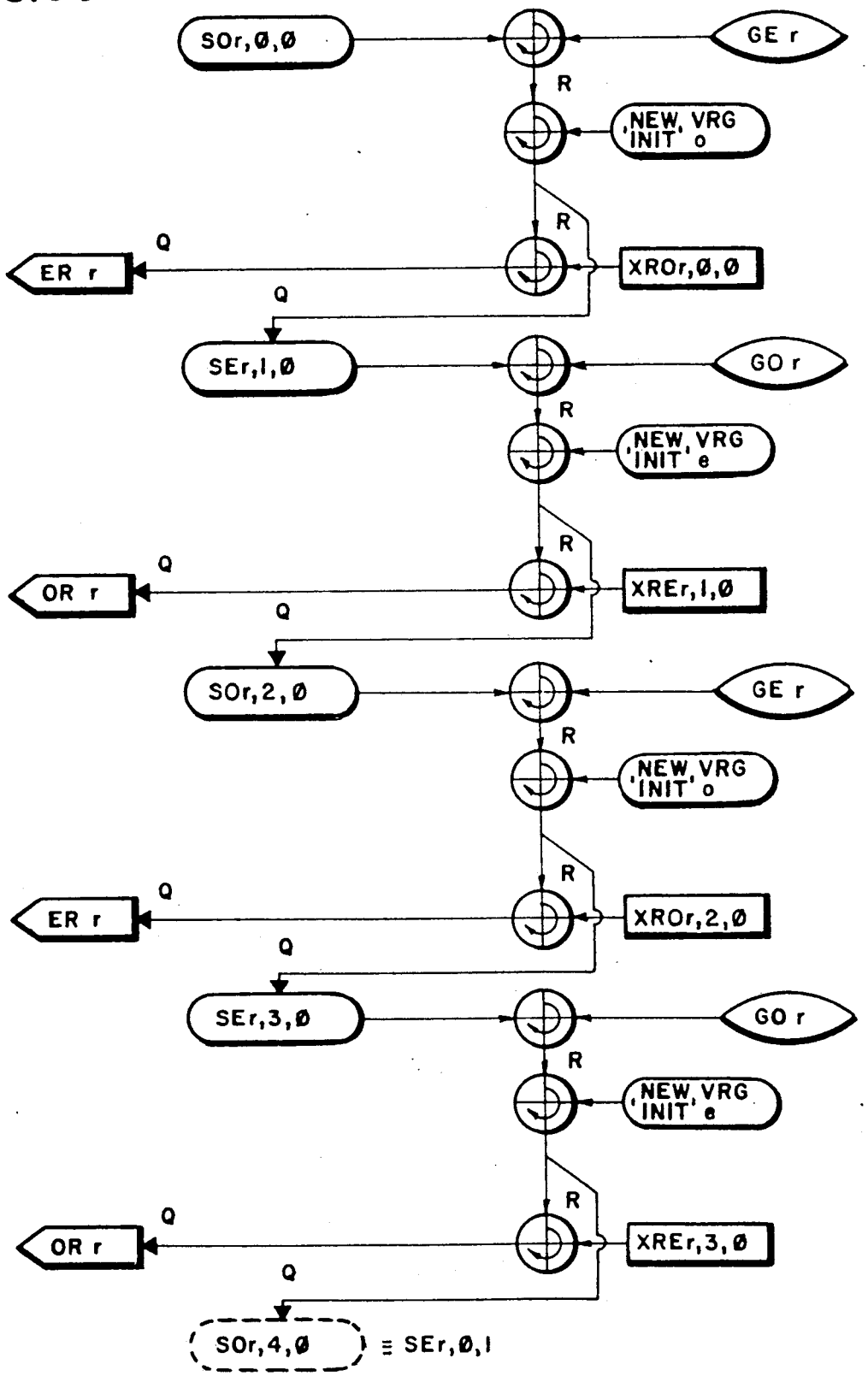

In the same manner, FIG. 8F shows the same initialization operation, this time when the initial good pulse of rate "r" happens to be GEr, formed on an "even" code rate cycle.

B. FIG. 8B shows the first established EVEN state of PDg for rate r(SER,0,1). Since the last good rate r pulse was an even one (GEr), the next one to be expected is an odd value (GOr). If GOr is the next input value, then it is combined with PDg. This result is combined with the INITIAL state of the other VRG (proving again that no other rate is established). The quotient of this operation is the new PDg state SOr,1,1, while the remainder of this operation is combined with the PROM value XRER,0,1 to produce ORr as a quotient. The quotient value ORr is sent to the Valid Rate Refresh function which will output valid R(E/O)r values every Tc seconds up to TMAXr.

If the next input value is NOT GOr, or if TMAXr is about to elapse, then one of the tolerance values can be consumed. In this case, the PDg value SEr,0,1 is shifted 32 times to form a remainder and a quotient. This is done to erase SEr,0,1 as a valid state. The PROM value BXREr,0,1 is then combined with the above quotient to form ORr as a quotient, which is sent to the Valid Rate Refresh function. The PROM value XSEr,0,1,0,0 is then combined with the remainder left from shifting SEr,0,1 and the resultant remainder becomes SOr,0,0, the new state of PDg (see FIG. 8B). This change of state is possible because the "tolerance" value implied in FIG. 8B is "1", while the tolerance value of the newly formed PDg state SOr,0,0 is "zero".

FIG. 8E shows that "Pr2" consecutive good rate r pulses must be received to keep producing valid ORr-/ERr values since there are no PROM values which can be used to compensate for bad pulses, the "tolerance value" in effect for FIG. 8E being "0".

C. If the state of PDg is SEr,0,1, (top of FIG. 8B), receiving Pr2 consecutive good pulses at rate r (here Pr2=4) will result in the PDg state "SEr,0,2" (top of FIG. 8C), which implies that the "tolerance" value=2. Note that SEr,0,2=SEr,4,1 (bottom of FIG. 8B).

Similarly, Pr2 consecutive good pulses at rate r will change the state of PDg from "SEr,0,2" to "SEr,0,3" with a tolerance of 3 (see FIG. 8D), and in the same manner "SEr,0,3" will become SEr,0,4" with a tolerance of 4.

This example has a maximum tolerance value of 4 (Pr3=4) and so the state of PDg will change from "SEr,0,4" to "SOr,0,4" and vice-versa, until either a pulse value is received whose value is not GEr or GOr, or no pulse value is received within TMAXr seconds from the previous one. (See FIG. 8K).

Figure 8K:
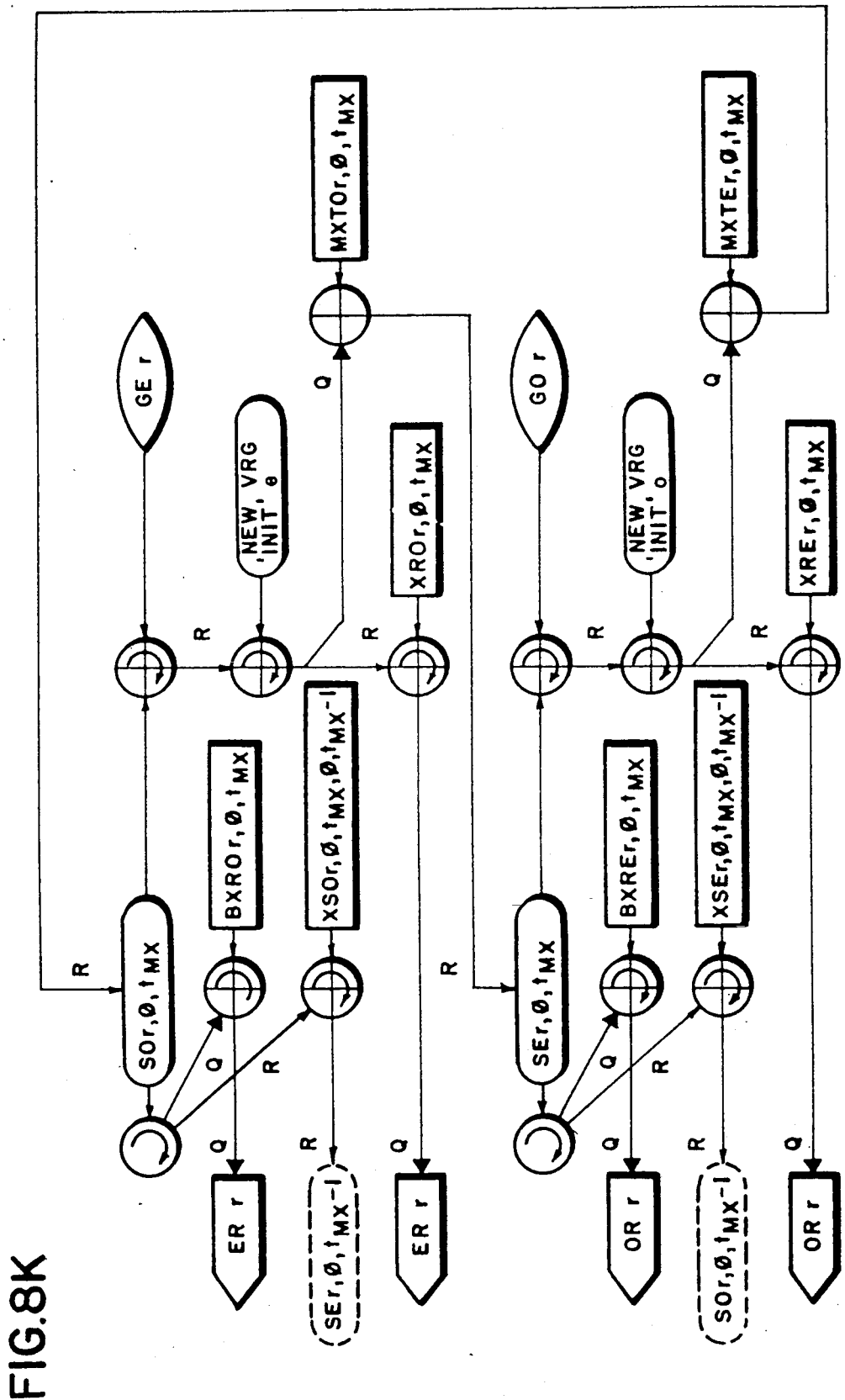

The PDg state of the VRG once the maximum value of the tolerance parameter has been reached is denoted S(E/O)r,0, tmx, where tmx=P3r, and "s" is always zero. In order to change state from SEr,0, tmx to SOr,0 tmx, and vice-versa with the receipt of GOr and GEr respectively, additional PROM parameters are required. The parameters MXTER,0,tmx and MXTOr,0, tmx are used, as shown in FIG. 8K.

FIGS. 8A through 8K show the entire state diagram of PDg for rate r with parameters Pr1=4, Pr2=4, and Pr3=4.

The function of the Valid Rate Refresh (VRR-block E of FIG. 3) is to vitally produce a pair of alternating values which represent the fact that rate r has been established and is currently being maintained as the valid rate code by the Valid Rate Generator. These alternating values are unique for each rate code r and are produced every Tc seconds. Tc is nominally 100 ms.

The alternating values produced are called REr and ROr, where E/O indicate EVEN and ODD Tc cycles. The refresh function will produce a limited number of REr/ROr alternating values after receipt of each of the alternating values ERr/ORr from the Valid Rate Generator. The refresh function must be refreshed within TMAXr/Tc seconds with the correct alternating value if continuous REr/ROr values are to be produced.

Figure 9A:
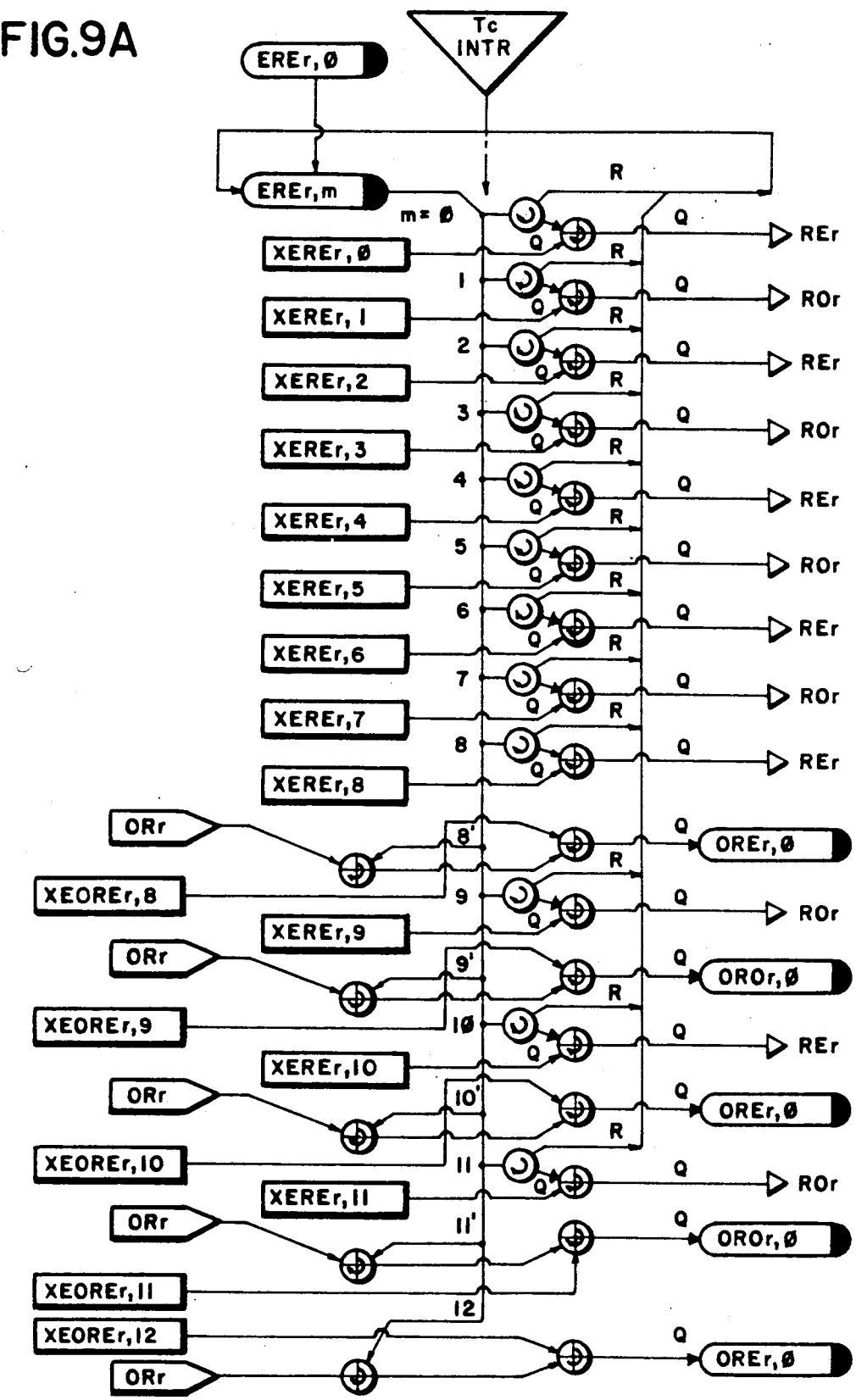
FIGS. 9A-9D show the four state diagrams for the valid rate refresh polynomial divider PDf.
Figure 9B:
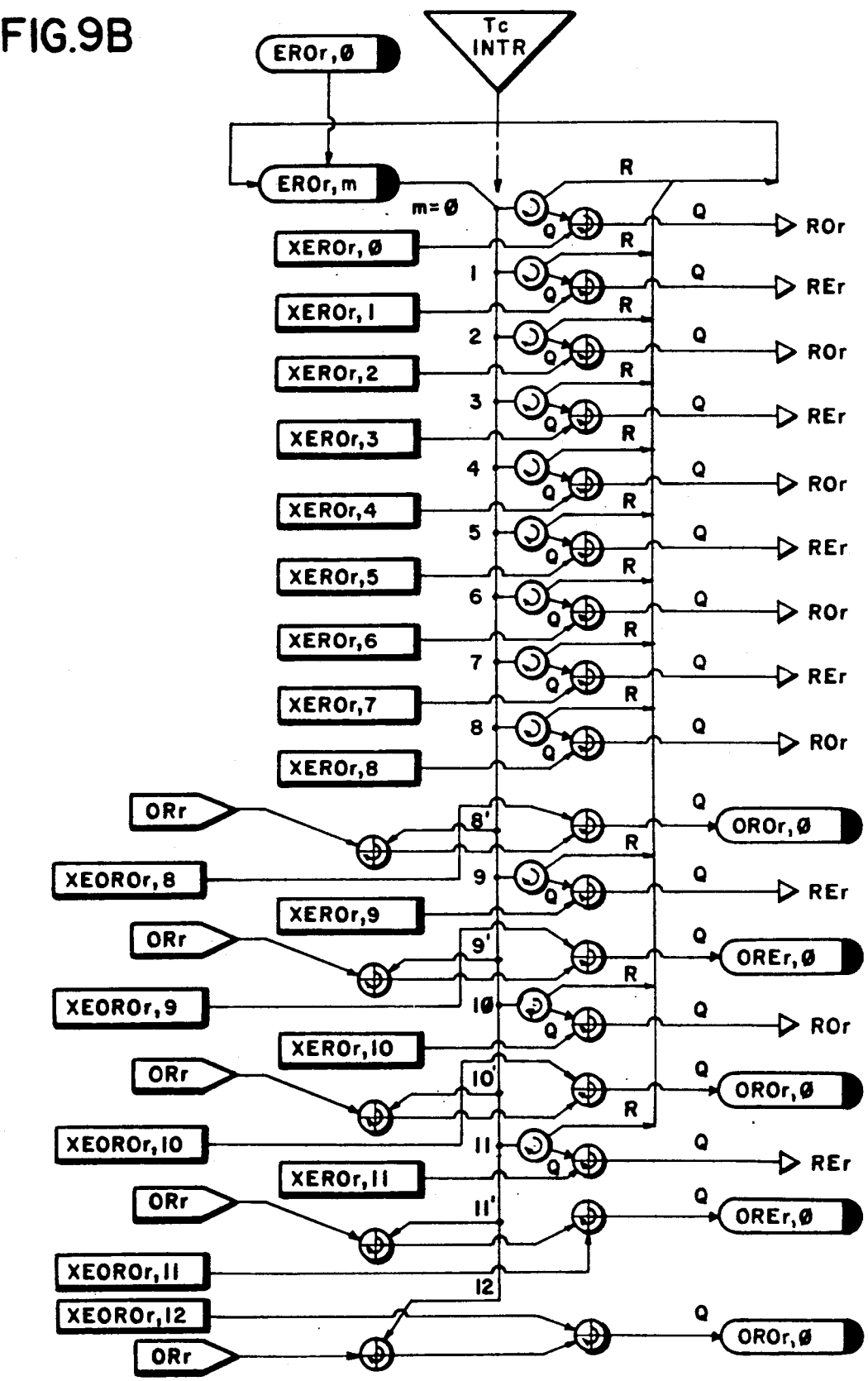

FIG. 9A shows one of the four state diagrams of the Valid Rate Refresh polynomial divider PDf. Here PDf is initialized (for rate code r) with the value "EREr,0". If rate r has just been established, then "EREr,0" has been formed by the initialization procedure in the Valid Rate Generator as shown in FIG. 8A.

If the rate r has previously been established, then the initial refresh cycle value EREr,0 would have been created by the combination of a PDf state with new ORr data from the Valid Rate Generator.

The "ER_r" portion of EREr,0 indicates that the last good pulse received of rate code r was an "even" one (i.e., from an even rate code cycle). The "_Er" indicates that the value was adjusted so that REr would be the first output produced from the refresh function. This implies that the previous refresh output was ROr, regardless of whether the previous "r" equals the current "r". The "_r,0" indicates that this value begins a refresh cycle for rate "r".

In the example of FIG. 9A, 12REr or ROr values can be produced from one ERr value. This means TMAXr/Tc=12. Note that the index value "m" is used to number the current Tc cycle from the beginning of the current refresh cycle. A refresh cycle is the length of time the refresh function remains within one state diagram before changing to one of the other four associated with rate r. In this example, TMAXr=1200 ms (assuming Tc=100 ms).

Referring to FIG. 9A, the operation of the refresh function is as follows:

The initial state (EREr,0) is loaded into PDf. It is immediately shifted 32 times in PDf, producing EREr,1 as the remainder and the new state of PDf, and a quotient value, which is then combined via the XOR/PD operation with the stored PROM parameter XEREr,0. The quotient of this operation is REr. After Tc seconds, the operation takes place again, with PROM parameter XEREr,1 being combined with the quotient result of EREr,1 shifted 32 times to form ROr as a subsequent quotient, while the resultant remainder of the shift operation becomes the new PDDf state, EREr,2.

In this example, this operation can continue for up to 12 cycles without being refreshed with a new ORr value from the Valid Rate Generator. After 12 cycles, however, there are no PROM parameters available to support the generation of REr/ROr, and the process which depends on those values fails.

Figure 9C:
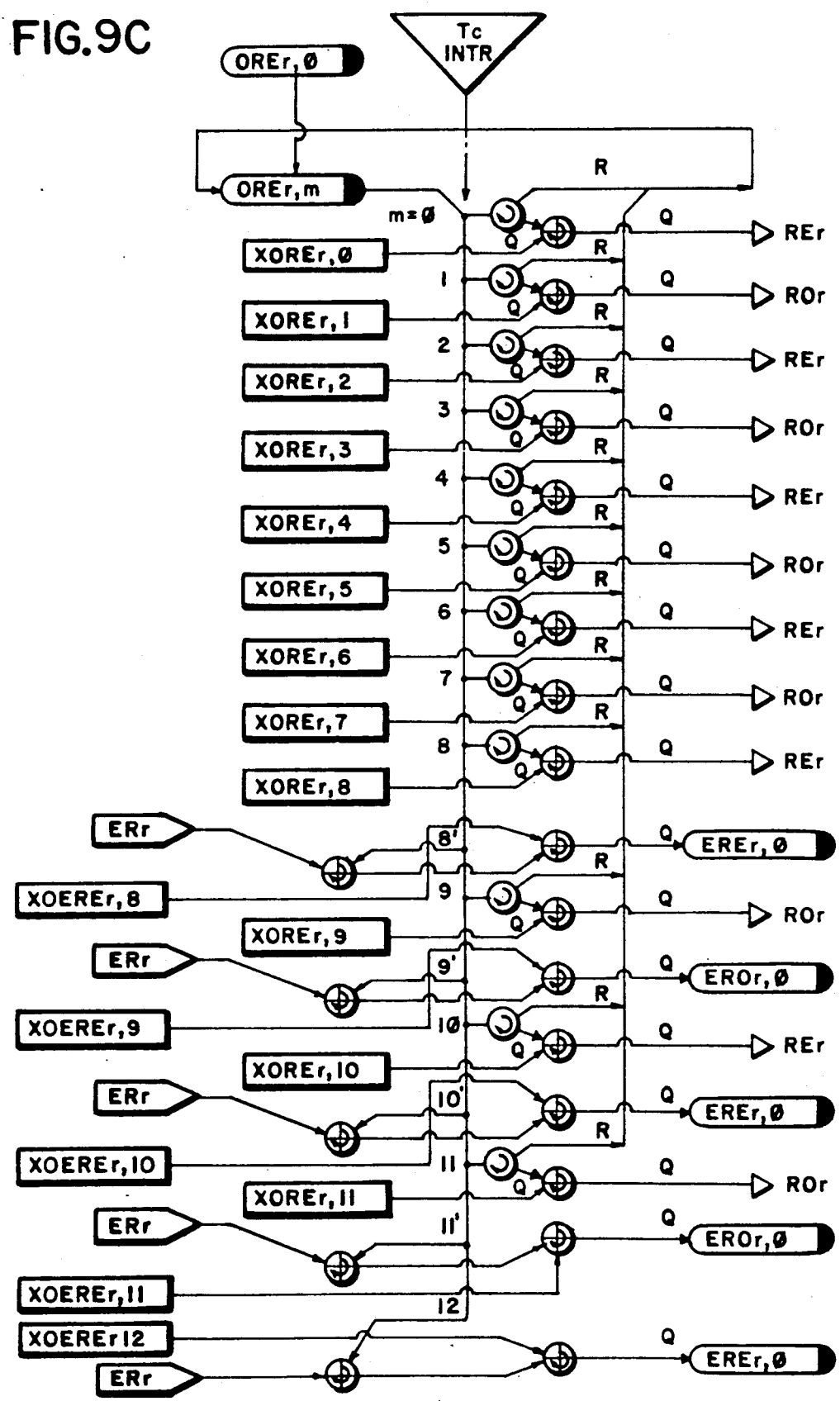
Figure 9D:
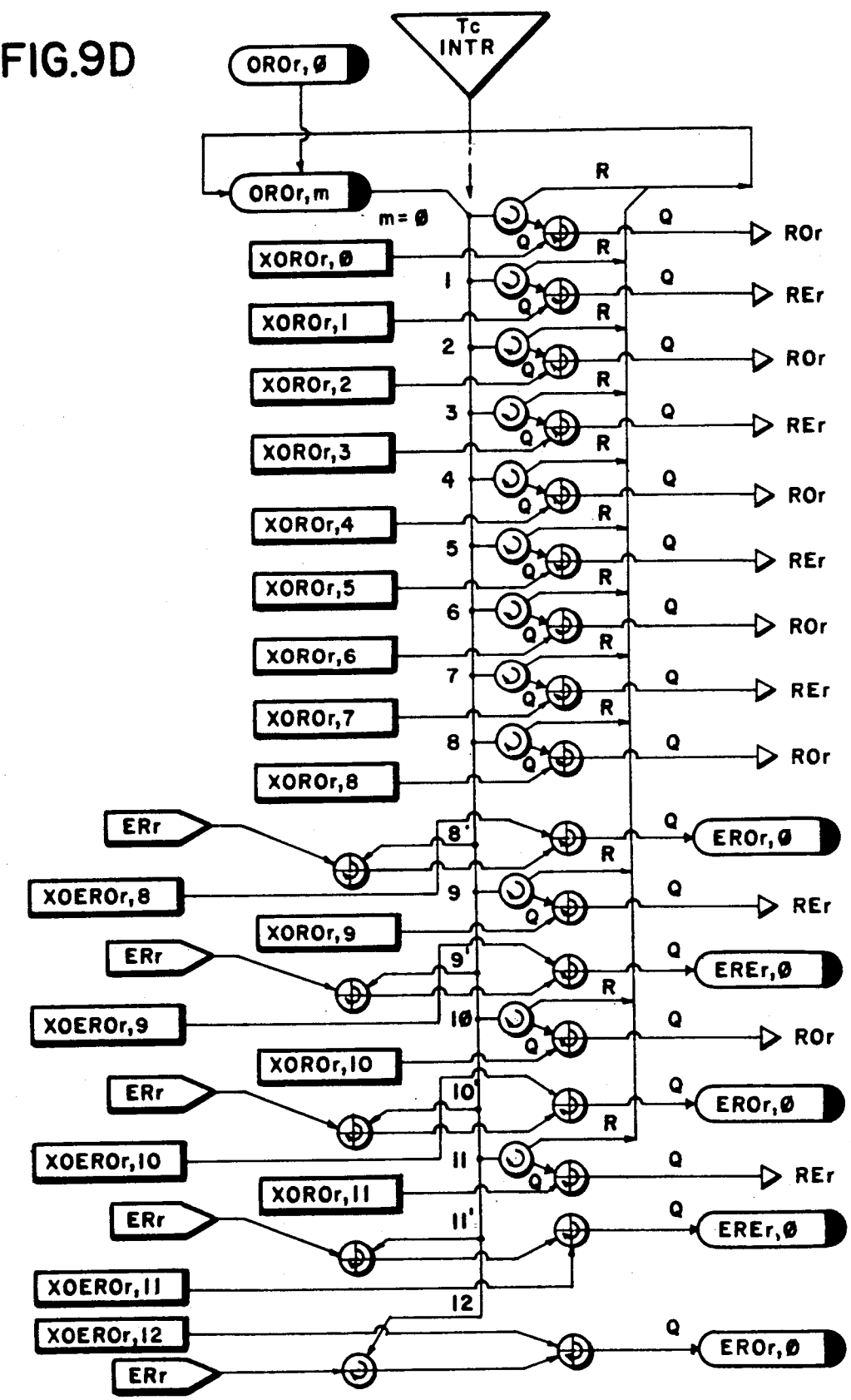

In this example, TNOMr equals approximately 8*Tc (800 ms). Therefore a new ORr value from the rate generator is expected between 8 and 12 cycles. When the ORr value is present, it is combined (via the XOR/PD operation with the current value of PDf. Then a PROM parameter (XEOREr,m, where m=8,9,10,11) is combined with the remainder of the last operation (via the XOR/PD operation) and its remainder is the new state of PDf. Note that the new state of PDf will be either OREr,0 or OROr,0, depending on whether ORr became available on a REr or ROr cycle. In the case of OREr,0, the state diagram of FIG. 9C is entered, and the process continues.

Figure 10:
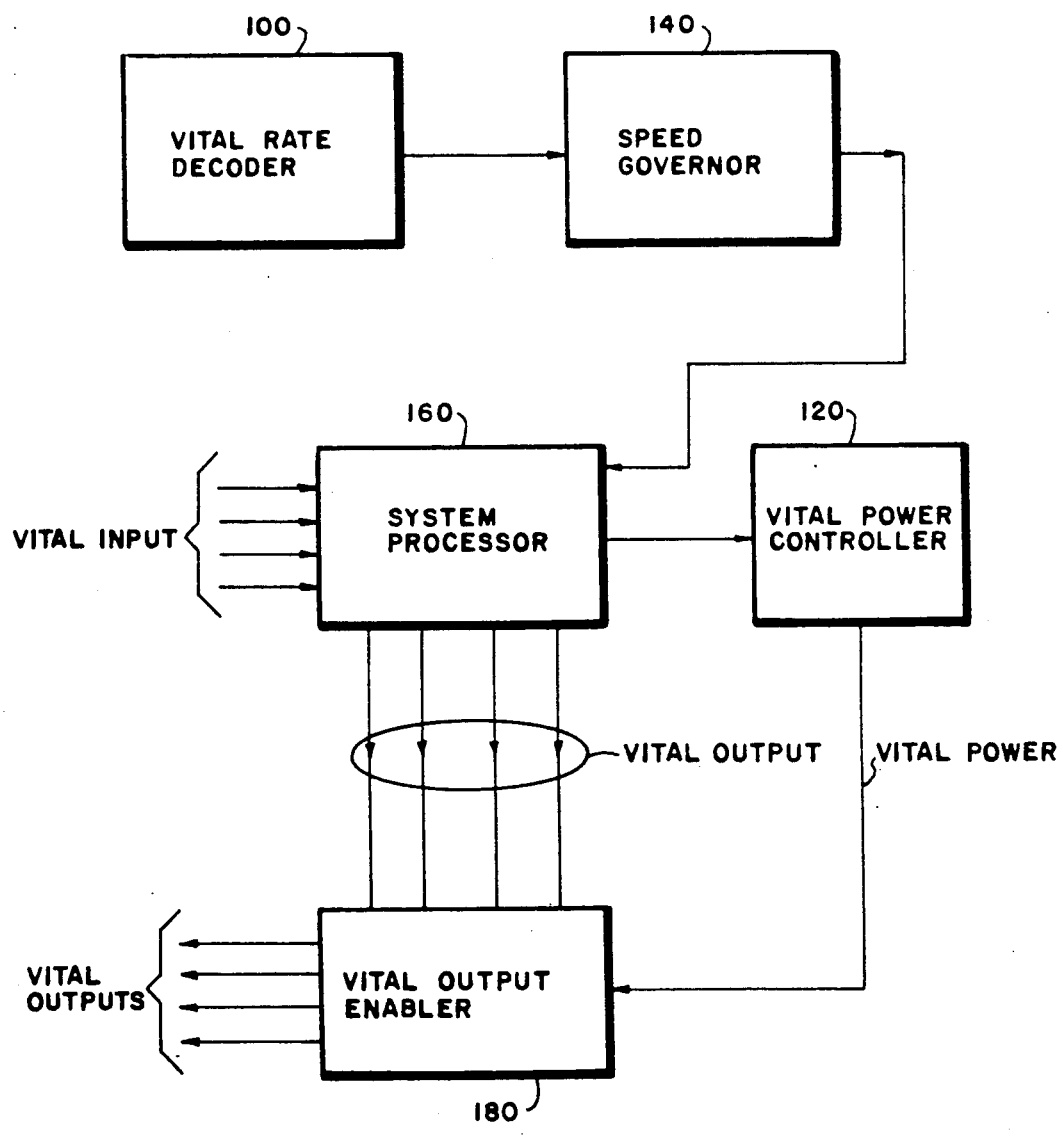
FIG. 10 is a block diagram illustrating the entire vital processing system of which the vital rate decoder of the present invention forms a part.

In order to enable the man skilled in the art to appreciate the role that the vital rate decoder of the present invention plays in a complete vital processing system, such system is depicted in FIG. 10, being designated 100. Also seen in this figure is a vital power controller with forgiveness feature that forms the subject matter of co-pending application Ser. No. 267,070, such being designated 120. Additionally, the digital overspeed controller 140 is described in co-pending application Ser. No. 267,218.

The overall or larger vital processing system seen in FIG. 10 also includes a vital processor 160, which serves to provide checkwords to the vital power controller 120; and the enabler device 180 simply combines the outputs from the vital processor 160 and the vital output from the vital power controller 140.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A vital rate decoder for use in a vital processing system to provide automatic train protection, comprising;

a pickup coil for picking up external signals;

means connected to said pickup coil, including two channels, for period and duty cycle measurement respectively of the pulse resulting from demodulation of said signals, each of said channels having an output;

a counter in each of said channels;

tolerance accumulation rate decoding means connected to said channel outputs, the maximum amount of tolerance accumulated, and the minimum time required to accumulate it, being functions of the rate code selected;

said tolerance accumulation rate decoding means including:

(a) means for extracting duty cycle information as well as period length in both of said channels, duty cycle information being accumulated by allowing the counter of one channel to count during the positive portion of the incoming signal, while the other channel is incrementing the counter therein during the entire period of the incoming signal; and (b) means for determining the validity of the period and duty cycle counts received on the even and odd cycles with respect to the allowed range of values specified for each rate code.

2. A device as defined in claim 1, in which said tolerance accumulation rate decoding means further includes a bandpass filter means centered at a carrier frequency and pulse edge detection means.

3. A device as defined in claim 2, further including a valid rate generator in each channel.

4. A device as defined in claim 3, further including a valid rate refresh means connected to both of said channels.

5. A device as defined in claim 1, in which said means for extracting duty cycle information includes a plurality of flip-flops and a buffer storage device in each of said channels.

6. A device as defined in claim 5, in which n is an entire period, and the counter in one of said channels accumulates count during said period.

7. A device as defined in claim 6, in which at the positive-going edge at the end of said period n, the contents of said one counter are transferred to said buffer storage device.

* * * * *